(12) United States Patent
Yamamoto et al.

(10) Patent No.: US 11,994,699 B2
(45) Date of Patent: May 28, 2024

(54) OPTICAL MEMBER

(71) Applicant: AGC Inc., Tokyo (JP)

(72) Inventors: Hiroyuki Yamamoto, Tokyo (JP); Takahiro Mashimo, Tokyo (JP); Takuji Oyama, Tokyo (JP); Shinya Tahara, Tokyo (JP); Tatsuo Nagashima, Tokyo (JP)

(73) Assignee: AGC Inc., Tokyo (JP)

( * ) Notice: Subject to any disclaimer, the term of this patent is extended or adjusted under 35 U.S.C. 154(b) by 673 days.

(21) Appl. No.: 17/145,536

(22) Filed: Jan. 11, 2021

(65) Prior Publication Data
US 2021/0132273 A1 May 6, 2021

Related U.S. Application Data

(63) Continuation of application No. PCT/JP2019/027906, filed on Jul. 16, 2019.

(30) Foreign Application Priority Data

Jul. 17, 2018 (JP) .................................. 2018-134363

(51) Int. Cl.
*G02B 5/20* (2006.01)
*B60J 1/00* (2006.01)
(Continued)

(52) U.S. Cl.
CPC .............. *G02B 5/208* (2013.01); *B60J 1/001* (2013.01); *B60J 1/02* (2013.01); *G02B 5/281* (2013.01); *G02B 5/285* (2013.01)

(58) Field of Classification Search
CPC . G02B 5/20; G02B 5/208; G02B 5/28; G02B 5/281; G02B 5/285; B60J 1/001;
(Continued)

(56) References Cited

U.S. PATENT DOCUMENTS 5,398,133 A * 3/1995 Tsai ..................... G02B 5/281
359/359
6,094,943 A * 8/2000 Okuda .................. C03B 27/044
65/114

(Continued)

FOREIGN PATENT DOCUMENTS

CN 107209306 A 9/2017
JP 2010-528968 A 8/2010
(Continued)

*Primary Examiner* — Stephone B Allen
*Assistant Examiner* — Jyotsna V Dabbi
(74) *Attorney, Agent, or Firm* — Oblon, McClelland, Maier & Neustadt, L.L.P.

(57) ABSTRACT

An optical member includes a transparent substrate containing at least one substance selected from glass, a glass ceramic, silicon, and sapphire, and having an infrared high-transmittance region in which an optical transmittance is 78% or more in a wavelength band of 700 nm to 1800 nm; and an optical interference film disposed on a main surface of the transparent substrate corresponding to the infrared high-transmittance region, wherein a transmittance of light, of the optical member, of at least one wavelength $\lambda_3$ in the wavelength band of 700 nm to 1800 nm in a region of the optical member corresponding to the infrared high-transmittance region of the transparent substrate has a minimum value of 86.5% or more and has a difference between the minimum value and a maximum value of 9% or less in a range where an incidence angle is from 0 degrees to 60 degrees.

20 Claims, 5 Drawing Sheets

(51) Int. Cl.
*B60J 1/02* (2006.01)
*G02B 5/28* (2006.01)

(58) Field of Classification Search
CPC .. B60J 1/02; C03C 17/3482; C03C 2217/734; C03C 4/0092; C03C 3/087; C03C 3/089; C03C 4/10; C03C 17/3417; C03C 17/3435; G01S 7/4813; G01S 17/931; C03B 27/0413
USPC .......................................................... 359/359
See application file for complete search history.

(56) References Cited

U.S. PATENT DOCUMENTS

| | | | |
|---|---|---|---|
| 9,606,275 B2* | 3/2017 | Nagaya | G02B 5/223 |
| 2012/0021230 A1* | 1/2012 | Fukatani | B32B 17/10036 |
| | | | 252/589 |
| 2016/0170192 A1* | 6/2016 | Yamamoto | C08J 7/0423 |
| | | | 359/360 |
| 2016/0238759 A1 | 8/2016 | Sprague et al. | |
| 2018/0196285 A1* | 7/2018 | Rigato | G02C 7/107 |
| 2020/0386928 A1 | 12/2020 | Takagi et al. | |

FOREIGN PATENT DOCUMENTS

| | | |
|---|---|---|
| JP | 2018-58738 A | 4/2018 |
| JP | 6538294 B1 | 7/2019 |
| WO | WO 2008/149093 A1 | 12/2008 |
| WO | WO 2015/091106 A1 | 6/2015 |
| WO | WO 2016/202606 A1 | 12/2016 |
| WO | WO 2020/025360 A1 | 2/2020 |

* cited by examiner

OPTICAL MEMBER

TECHNICAL FIELD

The present disclosure relates to an optical member, and in particular relates an optical member having a high transmittance over a wide range of incident angles with respect to light in the infrared band.

BACKGROUND ART

Recently, technological development regarding automated driving geared toward the actualization of various types of automated mobility services is intensifying. In automated driving techniques, it is considered to be of critical importance to measure the distance between a vehicle and objects in the surrounding area. Techniques for Light Detection and Ranging (LiDAR) sensors that utilize light in the infrared band are in use for performing such distance measurements.

An in-vehicle sensor that uses light, such as a LiDAR sensor, transmits and receives optical signals via window glass (for example, windshield of a vehicle). Therefore, there is a demand for high transmittance in window glass with respect to light utilized by the sensor. For example, Patent Literature 1 discloses, as window glass of a vehicle, laminated glass in which a colorant glass containing a predetermined amount of iron, titania, and ceria is used, with at least 30% transmittance in a wavelength band of 400 nm to 2100 nm corresponding to light in the visible band to the infrared band that is used by the sensor.

CITATION LIST

Patent Literature

[PTL 1] Japanese National Publication of International Patent Application No. 2010-528968

SUMMARY OF THE INVENTION

Technical Problem

In Patent Document 1 however, there is merely discussion regarding the transmittance of the laminated glass with respect to light at an incidence angle of 0 degrees, with no consideration given to transmittance characteristics with respect to light at a high incidence angle, and thus the value of transmittance with respect to a high incidence angle was insufficient. That is, in LiDAR sensors used for automated driving techniques, there is a demand for high transmittance characteristics of light in the infrared band (Hereinafter, referred to as "infrared light".) for a wide range of incidence angles. The laminated glass in Patent Document 1 does not meet such conditions.

An objective of the present disclosure is to provide an optical member having high transmittance over a wide range of incidence angles with respect to infrared light.

Solution to Problem

An optical member of the present disclosure includes:
a transparent substrate containing at least one substance selected from glass, a glass ceramic, silicon, and sapphire, and having an infrared high-transmittance region in which an optical transmittance is 78% or more in a wavelength band of 700 nm to 1800 nm; and
an optical interference film disposed on a main surface of the transparent substrate corresponding to the infrared high-transmittance region,
wherein a transmittance of light, of the optical member, of at least one wavelength $\lambda_s$ in the wavelength band of 700 nm to 1800 nm in a region of the optical member corresponding to the infrared high-transmittance region of the transparent substrate has a minimum value of 86.5% or more and has a difference between the minimum value and a maximum value of 9% or less in a range where an incidence angle is from 0 degrees to 60 degrees.

Effect of Invention

According to the present disclosure, the optical member having a high transmittance over a wide range of incidence angles with respect to infrared light can be obtained. The optical member of the present disclosure, when used, for example, as cover member of a LiDAR sensor, does not restrict the transmittance of infrared light to be used for sensing by the LiDAR sensor over large incidence angles. Furthermore, in a case where the optical member of the present disclosure is used as window glass when the LiDAR sensor is to be mounted in a vehicle, a reduction in the function of sensing via the window glass is unlikely to occur.

MODES FOR CARRYING OUT THE INVENTION

Figure 1A:
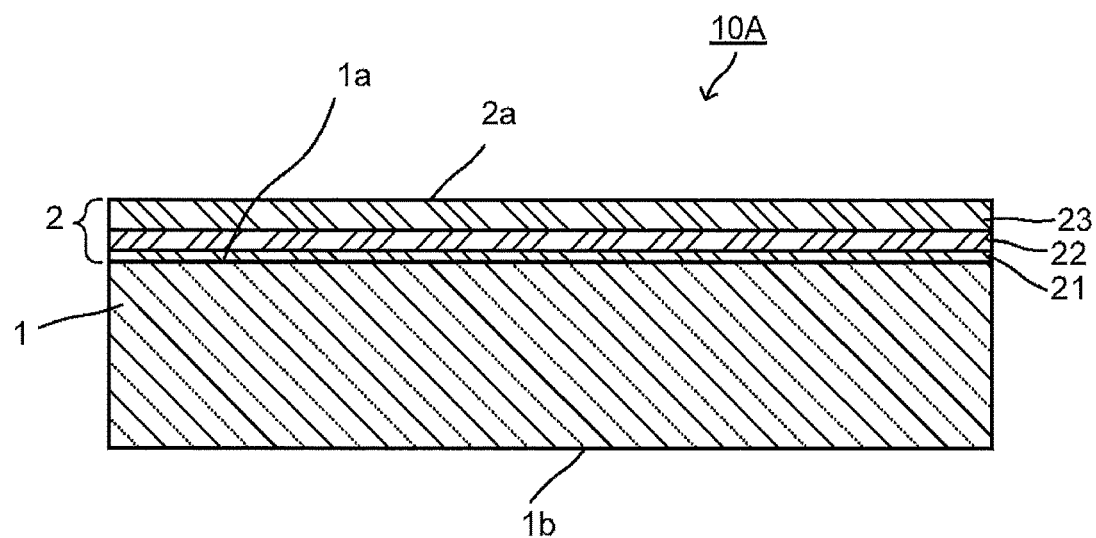
FIG. 1A is a cross-sectional view schematically illustrating an example of an optical member according to an embodiment.

Next, an embodiment of the present disclosure is described.

In the present specification, a transmittance that is, for example, 78% or more regarding a specific wavelength band means that the transmittance does not fall below 78% over the entire wavelength region. Likewise, a transmittance that is, 1% or less means that the transmittance does not exceed 1% over the entire wavelength region.

In the present specification, a numerical value range expressed using "to" includes an upper limit value and a lower limit value.

An optical member (Hereinafter, also referred to as "said optical member".) of an embodiment of the present disclosure includes a transparent substrate containing at least one substance selected from glass, a glass ceramic, silicon, and sapphire, and having an infrared high-transmittance region (Hereinafter, also referred to as "predetermined region".) in which transmittance of a wavelength band of 700 nm to 1800 nm is 78% or more, and includes an optical interference film disposed on a main surface of the transparent substrate corresponding to the infrared high-transmittance region. The condition (1) indicated below is satisfied in a region of the optical member corresponding to the infrared high-transmittance region of the transparent substrate.

The condition that the transparent substrate contains at least one substance selected from glass, a glass ceramic, silicon, and sapphire and the condition that the transmittance of a wavelength band of 700 nm to 1800 nm is 78% or more are referred to as the condition (A). In the present specification, the transmittance in the condition (A), is a transmittance measured with respect to incident light with an incidence angle of 0 degrees with respect to either main surface of the transparent substrate, and the incidence plane is not limited.

(1) The light transmittance, in at least one wavelength $\lambda_s$ within the wavelength band of 700 nm to 1800 nm and in a range where the incidence angle is 0 to 60 degrees, has a minimum value (Hereinafter, also referred to as "$T_{(1)min}$".) that is 86.5% or more and has a difference (Hereinafter, also referred to as "$\Delta T_{(1)}$".) that is 9% or less between the minimum value and a maximum value thereof. The wavelength $\lambda_s$ may also be referred to as simply "$\lambda_s$".

In (1), the incidence angle is an incidence angle with respect to a main surface of the optical member in the predetermined region. The optical characteristics described in the present specification, unless otherwise noted, are optical characteristics regarding light entering from either main surface of the optical member, and the incidence plane is not limited.

In the present specification, the transmittance and reflectance of a specific wavelength in the transparent substrate and the optical member is, for example, light of a wavelength of 700 nm to 1800 nm, and this is measurable by a spectrophotometer capable of altering the incidence angle, such as the V-570 manufactured by Hitachi High-Tech Corporation.

Said optical member has a high transmittance over a wide range of incident angles with respect infrared light with a wavelength of 700 nm to 1800 nm by satisfying the conditions of (1) in the aforementioned predetermined region. The predetermined wavelength $\lambda_s$ in (1) is a wavelength of laser light used for sensing by the LiDAR sensor that is used together with said optical member. It is acceptable if said optical member has one or more predetermined wavelengths that satisfy the condition of (1). Alternatively, the optical member may have two or more predetermined wavelengths that satisfy the conditions of (1). In one embodiment, the wavelength $\lambda_s$ is in a range of 750 nm to 900 nm, preferably is in a range of 775 nm to 875 nm, and more preferably is in a range of 800 nm to 850 nm. In another embodiment, the wavelength $\lambda_s$ is in a range of 830 nm to 980 nm, preferably is in a range of 855 nm to 955 nm, and more preferably is in a range of 880 nm to 930 nm. In yet another embodiment, the wavelength $\lambda_s$ is in a range of 975 nm to 1125 nm, preferably is in a range of 1000 nm to 1100 nm, and more preferably is in a range of 1025 nm to 1075 nm. In yet another embodiment, the wavelength $\lambda_s$ is in a range of 1475 nm to 1625 nm, preferably is in a range of 1500 nm to 1600 nm, and more preferably is in a range of 1525 nm to 1575 nm. In the description provided below, $T_{(1)min} \geq 86.5\%$ is referred to as the condition of (1-1), whereas $\Delta T_{(1)} \leq 9\%$ is referred to as the condition of (1-2).

In (1-1), if the $T_{(1)min}$ is 86.5% or more and, for example, the optical member is used together with the LiDAR sensor, this is indication that there is sufficient transmittance for ensuring a wide-angle scan by the LiDAR sensor. The $T_{(1)min}$ preferably is 87% or more, more preferably is 89% or more, and even more preferably is 90% or more.

In (1-2), if the $\Delta T_{(1)}$ is 9% or less, variation in transmittance in an incidence angle range of 0 degrees to 60 degrees in the wavelength $\lambda_s$ is sufficiently small for use in combination with, for example the LiDAR sensor, and the possibility of this variation constituting as noise is small. The $\Delta T_{(1)}$ preferably is 8% or less, more preferably is 7% or less, even more preferably is 5% or less, and yet even more preferably is 3.5% or less.

Said optical member, furthermore, in the aforementioned predetermined region, preferably includes at least one of the following conditions (2), (3), or (4), more preferably includes two or more of the conditions (2) to (4), and even more preferably includes all conditions (2) to (4).

(2) Light loss in light of the wavelength $\lambda_s$ incident at an incidence angle of 5 degrees is 3% or less. The light loss can be calculated as a value obtained by subtracting the transmittance and the reflectance from 100%. A case in which said optical member satisfies condition (2) and said optical member is used in combination with the LiDAR sensor is preferable because the sensor can efficiently receive incident light. Said light loss preferably is 2.5% or less, more preferably is 1.0% or less, and even more preferably is 0.7% or less.

(3) The optical member experiences a change in transmittance at an incidence angle of 0 degrees regarding light of the wavelength $\lambda_3$ upon exposure to an environment with a temperature of 60° C. and a relative humidity of 80% for 48 hours that is 1% or less. As long as condition 3 is satisfied, said optical member has superior durability in a usage environment of high temperature and high humidity.

In a case where said optical member is to be used as a cover member of a LiDAR sensor that is attachable to a vehicle body, for example, said optical member will be subjected to outside air. Also, in a case where the LiDAR sensor is mounted inside a vehicle, there are instances in which said optical member will be subjected to an environment of high temperature and high humidity. Even under such circumstances, stable usage over a prolonged period of time can be achieved as long as condition (3) is satisfied. Changes in the transmittance in (3) more preferably is 0.8% or less, even more preferably is 0.6% or less, and yet even more preferably is 0.4% or less.

(4) The Martens hardness at an indentation depth of 50 nm measured at the surface of the optical interference film of the optical member is greater than the Martens hardness at an indentation depth of 50 nm measured at the surface of the transparent substrate. In the present specification, the Martens hardness is a Martens hardness at an indentation depth of 50 nm upon performing a loading and unloading test with a microhardness tester using a Vickers indenter with a maximum arrival load time of 10 seconds, a creep time of 5 seconds, an indentation load from 0.05 mN to 500 mN, a load velocity of 1 mmN/10s, and an unloading velocity of 1 mmN/10s. Hereinafter, the Martens hardness at an indentation depth of 50 nm measured using the aforementioned measurement conditions is referred to simply as "Martens hardness".

As long as condition (4) is satisfied, an optical member having a Martens hardness in a surface of an optical interference film that is greater than that of a surface of a transparent substrate can be obtained. That is, an optical member with high durability can be obtained. The Martens hardness measured at the surface of said optical interference film of the optical member and the Martens hardness of the transparent substrate used for said optical member are described in detail below.

Although the embodiments of the present disclosure are described in reference to the drawings, the present disclosure is not limited to these embodiments.

FIG. 1 schematically illustrates an example of a cross-sectional view of said optical member according to an embodiment. An optical member 10A illustrated in FIG. 1 includes a transparent substrate 1 having a first main surface 1a and a second main surface 1b opposite from each other and an optical interference film 2. The entirety of the transparent substrate 1 satisfies the aforementioned condition (A) and the entirety of the optical interference film 2 is disposed on the entirety of the first main surface 1a of the transparent substrate 1.

The optical member 10A including the first transparent substrate 1 and the optical interference film 2 satisfies the aforementioned condition (1). In the example illustrated in FIG. 1, the optical interference film 2 is a multi-layer film including three layers with appended reference numbers 21, 22, and 23 that are stacked in this order on a side of the transparent substrate 1. In said optical member, any number of layers of an optical interference film that satisfies the condition (1) can be used in combination with a transparent substrate that satisfies the condition (A).

Also, as variations of the optical member 10A, examples are provided of a configuration where the optical interference film 2 is disposed on the second main surface 1b of the transparent substrate 1 and a configuration where the optical interference film 2 is disposed on both the first main surface 1a and the second main surface 1b of the transparent substrate 1. Since these examples also satisfy the condition (1), these variations are within the scope of said optical member.

Furthermore, said optical member may be configured such that the optical interference film 2 is provided in only a predetermined region on the first main surface 1a of the transparent substrate 1. In such as case, it is acceptable as long as the condition (1) is satisfied in the region in which optical interference film 2 of the transparent substrate 1 is provided, and thus it is not necessary for the region where the optical interference film 2 is not provided to satisfy the condition (A). Furthermore, in the region where the optical interference film 2 is not provided, it is not necessary for the transparent substrate 1 to satisfy the condition (A). The energy transmittance measured in compliance with JIS-R3106:1998 regarding the region of said optical member corresponding to a region other than the infrared high-transmittance region of the transparent substrate 1 preferably is 60% or less, more preferably is 50% or less, and particularly preferably is 45% or less, and even more particularly preferably is 40% or less.

For example, in a case where said optical member is used as window glass of an automobile and a LiDAR sensor is installed in the vehicle, merely the region where laser light by the LiDAR laser passes through the transparent substrate 1 provided in a size equal to that of the window glass may have the configuration in which the optical interference film 2 is disposed on a main surface of the transparent substrate 1 satisfying the condition (1). In this case, the optical interference film 2 may be provided on the interior side of the vehicle-interior surface of the transparent substrate 1, on the vehicle-exterior surface of the transparent substrate 1, or on both the vehicle-interior surface and the vehicle-exterior surface of the transparent substrate 1.

Figure 1B:
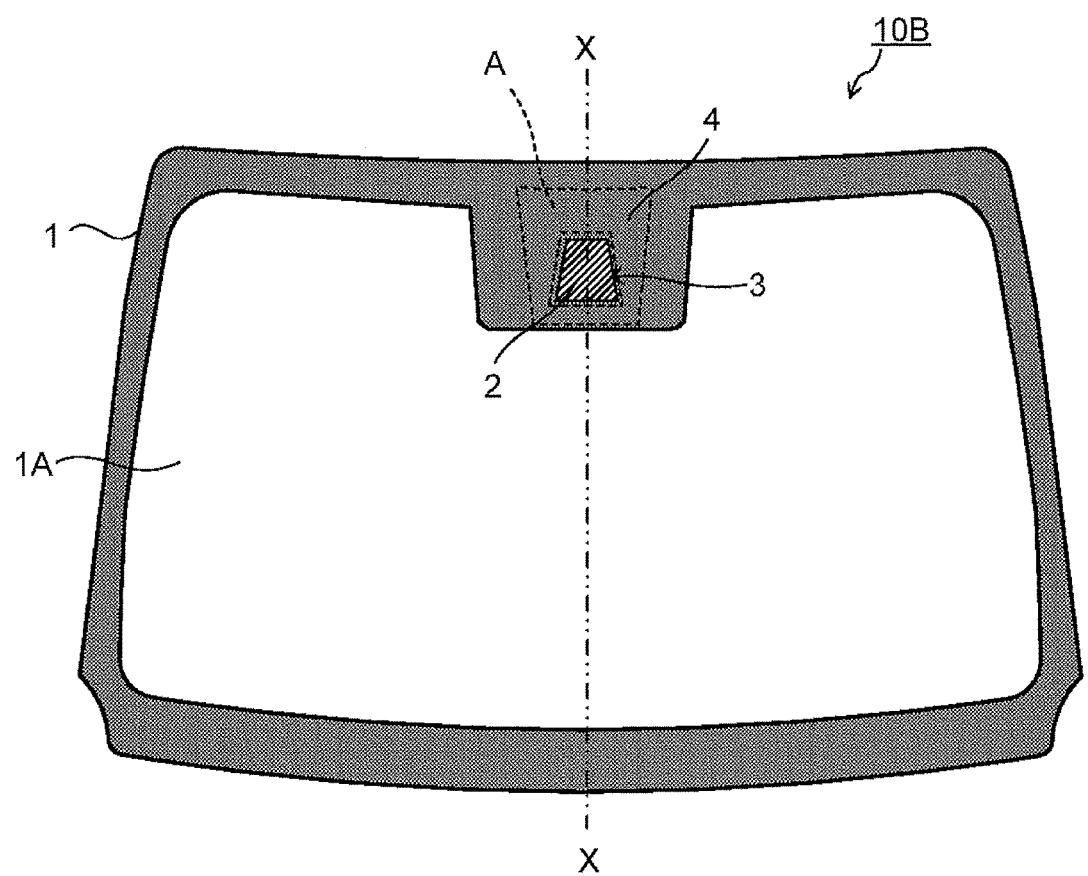
FIG. 1B is a plan view schematically illustrating an example of an optical member (windshield) according to the embodiment.
Figure 1C:
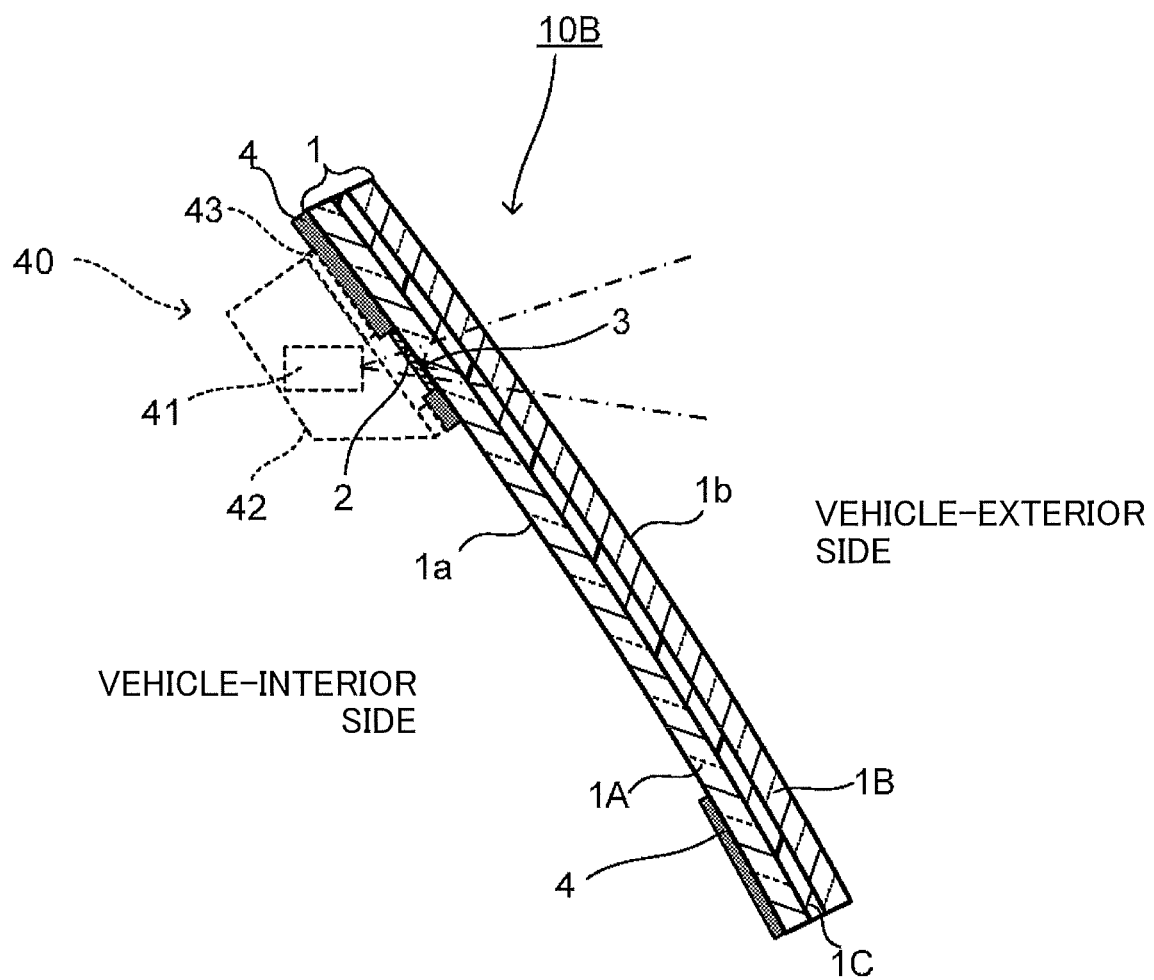
FIG. 1C is a cross-sectional view in X-X line of the optical member (windshield) illustrated in FIG. 1B.

FIG. 1B is a plan view of an example of said optical member according to the embodiment for use with the windshield of a vehicle. FIG. 1C is a cross-sectional view obtained by cutting the windshield illustrated in FIG. 1B along X-X line.

A windshield 10B that is said optical member includes the transparent substrate 1 and a blocking layer 4 that blocks visible light. The blocking layer 4 is provided on a vehicle-interior surface 1a of the transparent substrate 1 and is arranged along a periphery of the transparent substrate 1. The blocking layer 4 includes a protruding portion protruding in an in-plane direction (downward) from a central portion of a top side of the transparent substrate 1. The protruding portion has an opening 3 through which signals pass during transmission or reception of an infrared laser signals of a LiDAR sensor positioned substantially in the center portion. The optical interference film 2 is provided on the vehicle-interior surface 1a of the opening 3. FIG. 1B is a plan view of the windshield 10B as viewed from inside the vehicle.

An attachment portion A of the LiDAR sensor is illustrated as a dashed line in FIG. 1B. The attachment portion A is located in the area surrounding the opening 3 of the blocking layer 4. A configuration of the LiDAR sensor 40 that is attachable to the windshield 10B is schematically illustrated by a dashed line in FIG. 1C. The LiDAR sensor 40 includes a LiDAR sensor main unit 41 and a housing 42 that accommodates the LiDAR sensor main unit 41. The housing 42 of the LiDAR sensor 40 is attached to the attachment portion A by adhering the housing 42 to the blocking layer 4 via an adhesive layer 43.

The transparent substrate 1 of the windshield 10B is laminated glass. The laminated glass that is the transparent substrate 1 has a configuration in which a vehicle-interior glass sheet 1A and a vehicle-exterior glass sheet 1B are adhered together by an intermediate adhesive layer 1C. The laminated glass constituting the transparent substrate 1 is designed such that the region within the opening 3 satisfies the condition (A). As described above, the windshield 10B includes the optical interference film 2, corresponding to the opening 3, on a vehicle-interior surface 1a of the transparent substrate 1. By doing so, the opening 3 of the windshield 10B satisfies the aforementioned condition (1). Also, virtually no reduction in the sensing function occurs because reduction in the light amount over a wide range of incident angles is suppressed with respect to infrared laser light of the LiDAR sensor 40 that is transmitted and received via the opening 3.

Figure 1D:
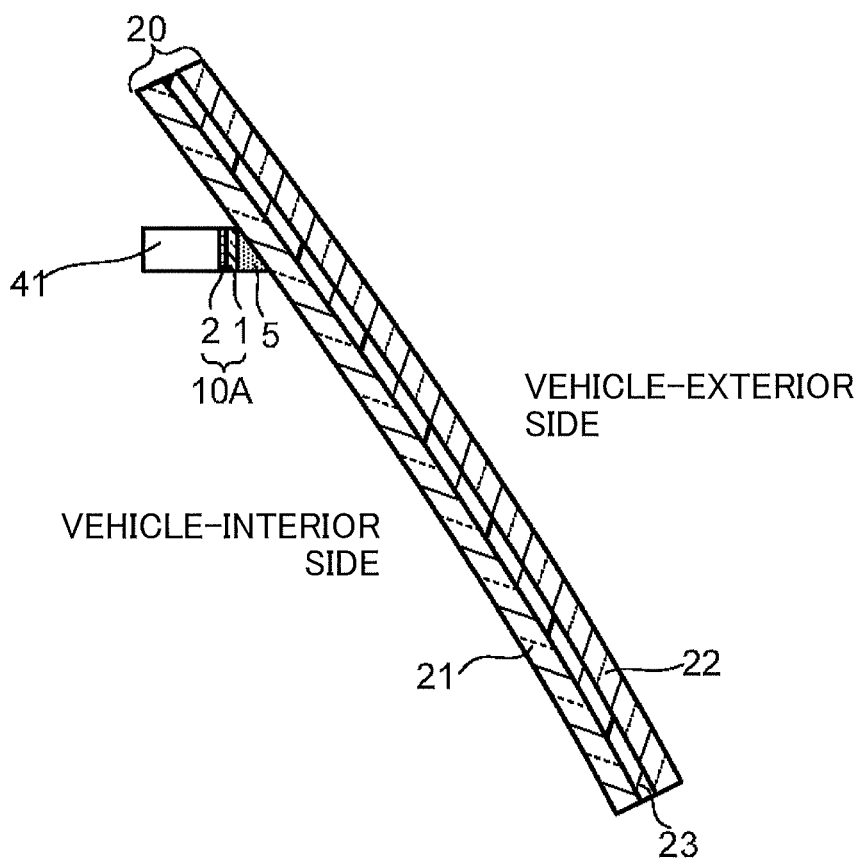
FIG. 1D is a cross-sectional view schematically illustrating one use case of the optical member illustrated in FIG. 1A.

FIG. 1D illustrates an example in which the optical member 10A illustrated in FIG. 1A is used as the cover member of the LiDAR sensor and the LiDAR sensor is attached to the vehicle-interior surface of the windshield. A windshield 20 has a configuration in which a vehicle-interior glass sheet 21 and a vehicle-exterior glass sheet 22 are adhered together by an intermediate adhesive layer 23. An optical member 10A is installed on the LiDAR sensor main unit 41 such that the optical interference film 2 is positioned on the side of the LiDAR sensor main unit 41. Also, the LiDAR sensor main unit 41 together with the optical member 10A attached thereto is attached to the windshield 20 by adhering the transparent substrate 1 of the optical member 10A to the vehicle-interior surface of the windshield 20 (laminated glass 20) via an optical adhesive layer 5.

In this case, the difference between a maximum value and a minimum value of plane stress in at least one or more locations within a region of 300 mm from the edge portion of the windshield 20 in a plane stress distribution of the surface of the windshield 20 preferably is 10 MPa or less, more preferably is 5 MPa or less, and most preferably is 1 MPa or less, from the standpoint of being able to reduce optical strain of the sensor attachment portion.

In this case, when the LiDAR sensor main unit 41 is operated, infrared laser light is transmitted and received via the optical member 10A and the laminated glass 20 between the vehicle-interior side and the vehicle-exterior side. Therefore, as long as the configuration of the laminated glass 20 is of a design that satisfies the condition (A), virtually no reduction in sensing occurs because the effects of the optical member 10A can be sufficiently exhibited and a reduction in the light amount over a wide range of incident angles can be suppressed with respect to the infrared laser light that is used by the LiDAR sensor main unit 41.

Next, the transparent substrate and the optical interference film constituting said optical member is described.

[Transparent Substrate]

In the present embodiment, the transparent substrate 1 has the first main surface 1a and the second main surface 1b opposing each other. The transparent substrate 1 includes at least one substance selected from glass, a glass ceramic, silicon, and sapphire and has a minimum transmittance in a wavelength band of 700 nm to 1800 nm (Hereinafter, also referred to as "$T_{B700-1800}$".) that is 78% or more. As described above, although the transparent substrate 1 does not need to satisfy the condition (A) in certain sections where appropriate, an example is described below in which the entirety of the transparent substrate 1 satisfies the condition W.

As long as the $T_{B700-1800}$ of the transparent substrate is 78% or more, said optical member satisfies the condition (1). The $T_{B700-1800}$ preferably of the transparent substrate preferably is 80% or more, more preferably is 85% or more, even more preferably is 88% or more, particularly preferably is 88.5% or more, even more particularly preferably is 89% or more, and most preferably is 89.5% or more.

Preferably, the transparent substrate has a minimum transmittance in the wavelength band of 800 nm to 1600 nm (Hereinafter, also referred to as "$T_{B800-1600}$".) that is 79% or more. If the $T_{B800-1600}$ of the transparent substrate is 79% or more, said optical member more sufficiently satisfies the condition of the $T_{(1)min}$ and $\Delta T_{(1)}$ particularly in a case where there is a wavelength $\lambda_s$ in a wavelength band of 800 nm to 1600 nm in (1). The $T_{B800-1600}$ of the transparent substrate preferably is 81% or more, more preferably is 86% or more, even more preferably is 89% or more, particularly preferably is 90.5% or more, and most preferably is 91% or more.

If the $T_{B700-1800}$ is 78% or more, the transparent substrate 1 may be configured to include only one substance among glass, a glass ceramic, silicon, and sapphire, may be configured to include a composition of these substances, or may include other materials other than these substances. The transparent substrate 1 may be a single sheet or may be a stacked body. In a case where the transparent substrate 1 is a stacked body, the transparent substrate 1 may be laminated glass having multiple glass sheets and a resin film that is disposed that is disposed between these glass sheets. In a case where the transparent substrate 1 is to include multiple layers such as laminated glass, when the laminated glass is configured, the transmittance of each layer is adjusted such that the $T_{B700-1000}$ is 78% or more.

The shape of the transparent substrate 1 may be that of a flat plate and may have a curvature along the entirety or along a portion of the transparent substrate 1. With respect to the transparent substrate 1 having a curvature, a flat transparent substrate is fabricated such that the configuration is the same as said transparent substrate 1, and then the optical characteristics such as the transmittance are measured. With respect to an optical member utilizing the transparent substrate 1 having a curvature, an optical member that has the same configuration as said optical member and utilizes a flat transparent substrate is fabricated, and then the optical characteristics are measured.

The thickness of the transparent substrate 1 can be appropriately adjusted for the intended usage within a range that satisfies the condition (A). The thickness of the transparent substrate 1, from the standpoint of strength and weight balance for ensuring safety, preferably is 0.5 to 5 mm, more preferably is 1 to 5 mm, yet even more preferably is 1.5 to 4.5 mm, and particularly preferably is 2 to 4.3 mm. In a case where the transparent substrate 1 is laminated glass, the combined thickness of the multiple glass sheets is to be regarded as the thickness of the transparent substrate 1. The Martens hardness that is to be measured at the surface of the transparent substrate 1 preferably is 4 N/mm$^2$ or more, more preferably is 4.5 N/mm$^2$ or more, and even more preferably is 5 N/mm$^2$.

The transparent substrate 1 preferably is made of amorphous material and even more preferably is made of glass. From a cost standpoint, it is particularly preferable that the transparent substrate 1 is made of amorphous glass that can be manufactured using the float technique. Preferably, the amorphous glass is iron-containing glass containing, for example, soda lime glass, borosilicate glass, non-alkali glass, aluminosilicate glass, alkali-free aluminosilicate glass, and quartz glass, as the basic glass, in addition to iron. Among the types of basic glass, soda lime glass and borosilicate glass are both preferable but soda lime glass is particularly preferable.

The content of iron (Fe) included in the iron-containing glass in terms of Fe$_2$O$_3$ with respect to the basic glass of 100 mass % preferably is 1 to 500 mass ppm, more preferably is 50 to 300 mass ppm, and even more preferably is 80 to 180 mass ppm. When the iron-containing glass has Fe content that is the upper limit value or less, the $T_{B700-1800}$ of the transparent substrate can be easily adjusted to 78% or more. Also, when the iron-containing glass has Fe content that is the aforementioned lower limit value or more, the temperature from the radiant heat during manufacturing can be retained, and thus the manufacturing characteristics can be maintained. When the iron-containing glass has Fe content that is the aforementioned upper limit value or less, the $T_{B700-1900}$ can be easily maintained at 78° or more.

More preferably, the iron-containing glass contains at least one metal oxide of 0.0001 to 2.5 mass % with respect to the basic glass of 100 mass %, the metal oxide being selected from the metal oxide group consisting of chromium oxide, cobalt oxide, manganese oxide, cerium oxide, copper oxide, and selenium oxide. One aforementioned metal oxide may be used alone or two or more metal oxides may be used in combination. Among these, it preferable to use one or more metal oxides selected from chromium oxide such as $Cr_2O_3$ and cobalt oxide such as $CoO$, $Co_2O_3$, $Co_3O_4$, and it is particularly preferable to use $Cr_2O_3$ and cobalt oxide in combination.

In a case where the iron-containing glass further contains both oxides $Cr_2O_3$ and Co, it is preferable that Fe is 20 to 500 mass ppm, $Cr_2O_3$ is 0.0015 to 1 mass %, and cobalt oxide is 0.0001 to 1 mass % with respect to the basic glass of 100 mass %.

The content of the aforementioned metal oxide with respect to the basic glass 100 mass % more preferably is 1 to 200 mass ppm, even more preferably is 2 to 100 mass ppm, and most preferably is 3 to 70 mass ppm. When the iron-containing glass contains the aforementioned metal oxide(s) within a range of the aforementioned content range(s), the value of the Redox ([ferrous iron ($Fe^{2+}$) in terms of [$Fe_2O_3$]/[total of ($Fe^{2+}+Fe^{3+}$) obtained by [ferrous iron ($Fe^{2+}$)+ferric iron ($Fe^{3+}$) in terms of $Fe_2O_3$]) increases, and thus the $T_{\beta700-1800}$ improves while maintain the manufacturing characteristics.

For iron-containing glass with basic glass that is soda lime glass, a total of $Al_2O_3$, MgO, and CaO preferably is 0.1 to 30 mass % denoted as mass % in terms of oxides. Said content more preferably is 5 to 25 mass % and even more preferably is 10 to 20 mass %. If the total content of $Al_2O_3$, MgO, and CaO is within one of the aforementioned ranges, the water resistance, acid resistance, and the weather resistance are good. Next, the composition of the basic glass is described. The "%" in the composition of the basic glass is denoted as mass % in terms of oxides, unless otherwise noted.

For basic glass used in iron-containing glass, the ratio expressed by $B_2O_3/(B_2O_3+R_2O)$ denoted as mass % in terms of oxides preferably is 0.3 or less, more preferably is 0.2 or less, and particularly preferably is 0.05 or less. $R_2O$ denotes $Na_2O+K_2O$. As long as said ratio is within the aforementioned range, composition alteration due to $B_2O_3$ volatilization can be suppressed, and thus even an unpolished glass sheet is applicable to said optical member.

It is preferred that the composition in terms of mass % as the composition of the basic glass used in iron-containing glass is as follows:
$SiO_2$: 55% to 85%;
$Al_2O_3$: 0% to 30%;
$B_2O_3$: 0% to 20%;
CaO: 0% to 20%;
MgO: 0% to 15%;
BaO: 0% to 20%;
$Na_2O$: 0% to 25%; and
$K_2O$: 0% to 20%.

$SiO_2$ is a component for forming a structure of glass. If the content of $SiO_2$ is 55% or more, the heat resistance, chemical durability, and weather resistance are good. If the content of $SiO_2$ is 85% or less, meltability is good because the viscosity at the time of glass melting does not become excessively high. The content of $SiO_2$ is preferably 60% or more. The content of $SiO_2$ is preferably 78% or less, and more preferably 75% or less.

Although $Al_2O_3$ is not an essential component, when there is $Al_2O_3$ is included, the weather resistance, heat resistance, and chemical durability are good, and Young's modulus increases. If the content of $Al_2O_3$ is 30% or less, meltability is good because the viscosity at the time of glass melting does not become excessively high, and devitrification hardly takes place. The content of $Al_2O_3$ preferably is 18% or less and more preferably is 6% or less.

Although $B_2O_3$ is not an essential component, when $B_2O_3$ is included, meltability is good because the viscosity at the time of glass melting does not become excessively high, and devitrification hardly takes place. If the content of $B_2O_3$ is 20% or less, the glass-transition temperature can be increased, and Young's modulus increases. The content of $B_2O_3$ preferably is 18% or less and is more preferably 4% or less.

Although CaO is not an essential component, when CaO is included, meltability is good because the viscosity at the time of glass melting does not become excessively high, and weather resistance improves. If the content of CaO is 20% or less, devitrification hardly takes place. The content of CaO preferably is 15° or less.

Although MgO is not an essential component, when MgO is included, meltability is good because the viscosity at the time of glass melting does not become excessively high, weather resistance improves, and Young's modulus increases. If the content of MgO is 15% or less, devitrification hardly takes place. Preferably, the content of MgO is 10% or less.

Although BaO is not an essential component, when BaO is included, meltability is good because the viscosity at the time of glass melting does not become excessively high, and weather resistance improves. If the content of BaO is 20% or less, devitrification hardly takes place. The content of BaO preferably is 10% or less and more preferably is 5% or less.

When $Na_2O$ is included, the melting temperature decreases. If the content of $Na_2O$ is 25% or less, devitrification hardly takes place, and the forming temperature decreases making bend-forming easy. Preferably, the content of $Na_2O$ is 5% to 20%. More preferably, the content of $Na_2O$ is 10% to 17%.

Also, although $K_2O$ is not an essential component, when $K_2O$ is included, the melting temperature decreases. If the content of $K_7O$ is 20% or less, devitrification hardly takes place. The content of $K_2O$ preferably is 10% or less or more preferably is 5% or less.

The iron-containing glass may be configured to contain components selected from the group, for example, consisting of $SnO_2$, $SO_3$, and Cl, as a clarifying agent.

Furthermore, in order to improve weather resistance, meltability, devitrification, ultraviolet light blocking, visible light blocking, and the like, the iron-containing glass may be configured to contain, for example, ZnO, $Li_2O$, $WO_3$, $Nb_2O_5$, $V_2O_5$, $Bi_2O_3$, $MoO_3$, $P_2O_5$, $Ga_2O_3$, $I_2O_3$, $In_2O_3$, $Ge_2O_3$, and the like. By doing so, the visible light transmittance and the like can be changed in the optical member for the intended usage as described further below.

Taking the burden on the environment into account, it is preferable to keep the iron-containing glass as a composition that is substantially free of $As_2O_3$ and $Sb_2O_3$. Also, for the purpose of stably performing float forming, it is preferable to keep the iron-containing glass a composition that is substantially free of ZnO.

The transparent substrate made of glass (Hereinafter, referred to as "glass substrate".) that is used for said optical member is obtained by appropriately blending various raw materials so that the composition is within a desired range, performing heating and melting, then performing defoaming, stirring, and the like to make the composition uniform, and then forming the composition into a sheet or the like by a well-known method such as the float method, the down-draw method, press method, or the roll-out method or forming the composition into block shape by casting, and after annealing, finally forming the mold into a sheet shape.

As the aforementioned glass substrate, it is preferable to use a glass sheet formed by the float method, for example.

Also, it is preferable that the glass substrate goes through a toughening process by being thermally tempered (physically tempered) or chemically tempered. By going through this toughening process, a compressive stress layer is formed on the surface of the glass substrate, and this improves the strength against scratches and physical impact.

In a case where a compressive stress layer is formed by physical tempering, the linear expansion coefficient of glass constituting the glass substrate preferably is $60 \times 10^{-7}/°$ C., more preferably is $71 \times 10^{-7}/°$ C., even more preferably is $75 \times 10^{-7}/°$ C., and particularly preferably is $85 \times 10^{7}/°$ C. Also, in order to improve the dimensional accuracy after physical tempering, the linear expansion coefficient of glass preferably is $100 \times 10^{-6}/°$ C., more preferably is $95 \times 10°$ C., and particular preferably is $90 \times 10^{-6}/°$ C. The linear expansion coefficient of glass in the present specification is an average linear expansion coefficient in the range of 50° C. to 350° C.

Preferably, the surface compressive stress (CS) of the physically-tempered glass substrate is 10 MPa or more, for example. The surface compressive stress more preferably is 30 MPa or more, even more preferably is 50 MPa or more, and particularly preferably is 100 MPa. The surface compressive stress (CS) is measured by using the following procedure.

A disc of which all the surfaces are mirror surfaces is fabricated from the glass substrate whose compressive stress layer has not yet been formed. Using the fabricated disc, a photoelastic constant is obtained by the disk compression method. Next, after cutting the glass substrate that received toughening treatment, the cut surface is optically polished. Then, retardation is measured by using a birefringence measuring device. Further, the retardation value measured is divided by the photoelastic constant and the glass substrate thickness to thereby obtain the generated stress (surface compressive stress (CS) of the surface).

In a case where the glass substrate to be used in said optical member is a toughened glass sheet, it is preferable that upon crushing of the toughened glass, by using the method according to Japanese Industrial Standard JIS R 3211, a square region of 50 mm×50 mm is crushed into 40 fragments to 400 fragments.

In a case where the glass substrate to be used in said optical member is laminated glass, it is preferable that there be a total weight of 20 g or less of fragment debris coming from the side opposite to where the glass substrate was impacted upon crushing of the glass substrate by using the method according to Japanese Industrial Standard JIS R 3211.

The size of the glass substrate to be used in said optical member can be appropriately adjusted for the intended usage. For example, a glass sheet obtained by, for example, the float method and by being cut into a predetermined size may be used. Preferably, the edge surfaces connecting the first main surface and the second main surface of the glass substrate together are chamfered for the purpose of, for example, preventing breaks from occurring at the edge portions or in the vicinity of the edge portions.

In a case where the transparent substrate to be used in said optical member is laminated glass as illustrated in FIG. 1B and FIG. 1C, the transparent substrate may satisfy the condition (A) by configuring the vehicle-interior glass sheet 1A or the vehicle-exterior glass sheet 1B with the aforementioned iron-containing glass. More preferably, the transparent substrate satisfies the condition (A) by configuring both the vehicle-interior glass sheet 1A and the vehicle-exterior glass sheet 1B with the aforementioned iron-containing glass. In such cases, an intermediate adhesive layer containing, as a main component, a thermoplastic resin such as polyvinyl butyral (PVB), ethylene vinyl acetate (EVA), or cyclo olefin polymer (COP) used in typical laminated glass can be used as the intermediate adhesive layer 1C without particular limitation.

Further, in a case where said optical member is colored and the transparent substrate is laminated glass for example, a near-infrared light-transmissive resin film may be provided between the intermediate adhesive layer and the glass substrate. In this case, the near-infrared light-transmissive resin film is formed as a coating film on the main surface, of the vehicle-interior glass or the vehicle-exterior glass, facing the intermediate adhesive layer.

[Optical Interference Film 2]

The optical interference film 2 is formed on the first main surface 1a of the transparent substrate 1 and functions such that the obtained optical member 10A satisfies the condition (1). The optical interference film 2, for example, in the obtained optical member 10A, causes the reflectance to decrease more than in a case where the transparent substrate is used alone, with respect to light of the wavelength $\lambda_s$ in an incidence angle range of 0 degrees to 60 degrees, and thus functions such that the optical member 10A satisfies the condition (1). It is preferable that the optical interference film 2 functions such that the obtained optical member 10A further satisfies one or more conditions selected from the conditions (2), (3), and (4).

If the optical interference film 2 functions such that the optical member 10A satisfies the condition (1) and preferably further satisfies the conditions (2, (3), and (4), the film may also function to impart visible light blocking, ultraviolet light blocking, antifouling characteristics, dust resistance, for example, and other functions that, for example, improve durability.

If the optical interference film 2 has the aforementioned functionality, there are no particular limitations with respect to the configuration. The optical interference film 2 may be configured so as to be provided on only the first main surface 1a of the transparent substrate 1 such in the optical member 10A illustrated in FIG. 1, may be configured so as to be provided on only the second main surface 1b of the transparent substrate 1, or may be configured so as to be provided on both the first main surface 1a and the second main surface 1b of the transparent substrate 1.

There is no difference in the design of the optical interference film 2 between a case where the optical interference film 2 is provided on only the first main surface 1a of the transparent substrate 1 and a case where the optical interference film 2 is provided on only the second main surface 1b of the transparent substrate 1. In a case where an optical interference film is provided on both main surfaces of a transparent substrate, the optical member obtained by the two optical interference films used in combination satisfies condition (1), and more preferably, each of the optical interference films is designed so as to satisfy one or more conditions selected from the conditions (2), (3), and (4).

In the case where the optical interference film is provided on both main surfaces of the transparent substrate, it is not necessary for the optical member using only one of either optical interference film to satisfy the condition (1). The optical member using only one preferably satisfies the condition (1) and preferably, and an optical interference film that satisfies the conditions (2), (3), and (4) is provided on both main surfaces of the transparent substrate. In this case, the $T_{(1)min}$ and $\Delta T_{(1)}$ improves more whereas the light loss in (2) is apt to increase in comparison to the case where only one of either optical interference film is used. The configuration of the optical interference film may be appropriately selected in accordance with the optical characteristics needed in the optical member.

Although the optical interference film 2 may be a single layer film constituting only a single layer or a multilayer film having two or more stacked layers, the multilayer film is preferable. In a case where the optical interference film is a multilayer film, the multilayer preferably has two or more layers including a high refractive index layer and a low refractive index layer. From the standpoint of manufacturing cost and layer thinning, the total number of layers in the multilayer film preferably is ten or less layers and more particularly preferably is four or less layers.

In a case where the multiyear film has a low refractive index layer and a high refractive index layer, the low refractive index layer and the high refractive index layer preferably are stacked upon each other adjacently. The low refractive index layer is made of a material with a low refractive index (low refractive index material) whereas the high refractive index layer is made of a material with a high refractive index (high refractive index material). The difference in the refractive index between the low refractive index layer and the high refractive index layer, that is, the difference in the refractive index between the low refractive index material and the high refractive index material may be greater than zero and preferably is 0.1 or more. The refractive indexes of the optical thin-films constituting the optical interference film described in the present specification signify the refractive indexes of all the respective materials in the light of the predetermined wavelength $\lambda_s$.

The multilayer film that includes the low refractive index layer and the high refractive index layer may further include an intermediate refractive index layer. The intermediate refractive index layer includes an intermediate refractive index layer that has a refractive index that is higher than the refractive index of the low refractive index layer and lower than the refractive index of the high refractive index layer. In a case where the multilayer film includes the low refractive index layer, the high refractive index layer, and the intermediate refractive index layer, preferably the low refractive index layer and the high refractive index layer are stacked upon each other adjacently and the intermediate refractive index layer is stacked so as to contact a main surface, of the high refractive index layer, opposite to the other main surface, of the high refractive index layer, in contact with the low refractive index layer. Alternatively, the intermediate refractive index layer is stacked so as to contact a main surface, of the low refractive index layer, opposite to the other main surface, of the low refractive index layer, in contact with the high refractive index layer.

The geometric thickness of each of the layers, in the case where the optical interference film 2 is a multilayer film, may be appropriately set to suit the materials to be used and the optical characteristics needed. In the optical interference film 2, since the wavelength band of the infrared band is a key concern, it is preferable that at least one layer among the layers constituting the optical interference film 2 has a geometric thickness of 50 nm or more. Assuming that at least one of the layers has a thickness of 50 nm or more, the geometric thicknesses of each layer (the per-layer film thickness) constituting the optical interference film 2 may be set to a 5 nm to 500 nm. In the optical interference film 2, transmittance reduction due to optical scattering can be suppressed by setting the upper limit of the per-layer film thickness to 500 nm. Also, by setting the per-layer film thickness of the optical interference film 2 to 5 nm or more, the optical interference film 2, in actuality, exists as a continuous film, enabling the functions to be sufficiently exhibited.

Also, since the wavelength band of the infrared band is a key concern, the geometric total film thickness of the optical interference film 2 preferably is 300 nm, more preferably is 400 nm or more, and even more preferably is 500 nm or more. However, in or to prevent warping of the transparent substrate and transmittance reduction due to optical scattering, the geometric total film thickness of the optical interference film 2 preferably is 2000 nm or less, more preferably is 1500 nm or less, and even more preferably is 1200 nm or less.

In a case where an optical interference film is provided on both main surfaces of the transparent substrate, the individual optical interference films may each have substantially the same configuration as that described above. However, the upper limit of the geometric total film thickness of the optical interference is preferably 4000 nm, with 4000 nm being the combined total of the two optical interference films. When the optical interference film is provided on both main surfaces of the transparent substrate, the internal compressive stress of the optical interference suppresses warping of the transparent substrate.

The optical interference film in the optical member 10A illustrated in FIG. 1 is an example of an optical interference film 2 having a configuration in which an intermediate refractive index layer, a low refractive index layer, and a high refractive index layer are stacked upon one another. The optical interference film 2 has a configuration in which an intermediate refractive index layer 21, a high refractive index layer 22, and a low refractive index layer 23 are sequentially stacked in this order on the first main surface 1a side of the transparent substrate 1.

The refractive index of the low refractive index material constituting the low refractive index layer 23 preferably is 1.35 or more and less than 1.55. Examples of a material as the low refractive index material include a material mainly composed of a low refractive index substance such as silicon oxide, magnesium fluoride, and the like. The term "mainly composed of a substance" in each refractive index layer means that said substance is contained at 50 mol % or more. The low refractive index material has a low refractive index and preferably is mainly composed of at least one type of a low refractive index substance as long as the refractive index is adjusted to be within the aforementioned range, and furthermore may contain an intermediate refractive index substance and a high refractive index substance. The low refractive index material preferably includes only a low refractive index substance and more preferably includes only one type of a low refractive index substance. From the standpoint of reproducibility, stability, and economic efficiency in film formation, it is preferable that silicon oxide is used as the low refractive index substance.

The refractive index of a high refractive index material constituting the high refractive index layer 22 is preferably 1.90 to 5.00. Examples of a material as the high refractive index material include a material mainly composed of a high refractive index substance such as silicon nitride, silicon oxynitride, aluminum nitride, aluminum oxynitride, zirconium oxide, tin oxide, cerium oxide, silicon, copper oxide, germanium, titanium oxide, niobium oxide, tantalum oxide, and the like. The high refractive index material has a high refractive index and preferably is mainly composed of at least one type of a high refractive index substance as long as the refractive index is adjusted to be within the aforementioned range, and furthermore may contain a low refractive index substance and an intermediate refractive index substance. The high refractive index material preferably includes only a high refractive index substance.

Among these high refractive substances, silicon nitride, silicon oxynitride, aluminum nitride, aluminum oxynitride, zirconium oxide, titanium oxide, niobium oxide, tin oxide, cerium oxide, silicon, and copper oxide are preferable because the desired optical characteristics can be obtained in a case where a multilayer film is used. Furthermore, from the standpoint of obtaining a desired hardness when the multilayer film is formed, silicon nitride, silicon oxynitride, aluminum nitride, aluminum oxynitride, zirconium oxide, tin oxide, and cerium oxide are preferable, silicon nitride, zirconium oxide, and aluminum nitride are more preferable, and silicon nitride is particularly preferable.

The transparent substrate 1 having a curvature may include the optical interference film 2 that is a multilayer film. In a case where the transparent substrate 1 is a glass sheet, the optical interference film may be stacked onto the glass sheet after the glass sheet is bent to a predetermined shape. Alternatively, the glass sheet may be bent to a predetermined shape after stacking the optical interference film onto the glass sheet. It is more preferable to bend the glass sheet after stacking the optical interference film onto the glass sheet because this way the optical interference film can be stacked on a flat surface. However, since the glass sheet is heated to the vicinity of the softening point in order to bend the glass sheet, it is important for the optical interface film to be such that not quality does not change due to high temperatures. In such an optical interference film, it is preferable to use zirconium oxide, aluminum oxide, aluminum oxynitride, tantalum oxide, silicon nitride, silicon oxynitride, mixtures thereof, and a mixture of titanium oxide and zirconium oxide as the high refractive index material constituting the high refractive index layer and preferable to use silicon oxide as the low refractive index material constituting the low refractive index layer.

The refractive index of the intermediate refractive index material constituting the intermediate refractive index layer 21 is preferably 1.55 or more and less than 1.90. Examples of a material as the intermediate refractive index material include a material mainly composed of an intermediate refractive index substance such as a mixture of aluminum oxide, silicon oxynitride, aluminum oxynitride, silicon oxide, and zirconium oxide, a mixture of silicon oxide and aluminum nitride, and the like. The intermediate refractive index material is a refractive index that is between the refractive index of the high refractive index material and the refractive index of the low refractive index material, preferably is mainly composed of at least one type of an intermediate refractive index substance as long as the refractive index is adjusted to be within the aforementioned range, and furthermore may contain a low refractive index substance and a high refractive index substance. A mixture of silicon oxide and aluminum nitride is a preferable example of the intermediate refractive index substance. The intermediate refractive index material preferably includes only an intermediate refractive index substance and more preferably includes only one type of an intermediate refractive index substance.

As the intermediate refractive index substance, aluminum oxide, silicon oxynitride, and aluminum oxynitride are preferable and a mixture of aluminum oxide, zirconium oxide, and silicon oxide are particularly preferable because the desired optical characteristics and hardness can be obtained when made into a multilayer film.

In the metal compound used for each of the refractive index layers described above, it is not necessary for silicon nitride, for example, to have a stoichiometric composition ratio of silicon nitride that is Si:N=3:4, and the composition ratio may be a non-stoichiometric composition ratio that deviates therefrom, for example. In the present specification, metal nitrides, oxides, and oxynitrides notated as metal name+nitride, metal name+oxide, and metal name+oxynitride, unless otherwise noted, indicate nitrides, oxides, and oxynitrides of a stochiometric composition ratio or a non-stochiometric composition ratio. As necessary, silicon nitride may be described as $SiN_x$.

The geometric thickness of the intermediate refractive index layer 21, the high refractive index layer 22, and the low refractive index layer 23 in the optical interference film 2 can be set appropriately to suit the materials constituting the respective layers and the needed optical characteristics. For example, the following two combinations (i) and (ii) are preferable as optical thicknesses for the respective layers in a case where the intermediate refractive index layer 21, the high refractive index layer 22, and the low refractive index layer 23 are made of aluminum oxide, silicon nitride, and silicon oxide, respectively. In the following, "$t_{21}$" indicates the optical thicknesses of the intermediate refractive index layer 21 made of aluminum oxide, "$t_{22}$" indicates the optical thicknesses of the high refractive index layer 22 made of silicon nitride, and "$t_{23}$" indicates the optical thicknesses of the low refractive index layer 23 made of silicon oxide.

$$t_{21}=0.354\lambda_s, t_{22}=0.164\lambda_s, t_{23}=0.341\lambda_s \qquad (i)$$

$$t_{21}=0.260\lambda_s, t_{22}=0.140\lambda_s, t_{23}=0.311\lambda_s \qquad (ii)$$

However, these coefficients are representative values, and thus in actuality the optical thicknesses may be widths that are ±5% of these values. The same applies in the example indicated below.

In a case where there are two or more predetermined wavelengths, it is effective to have a film configuration that achieves a high transmittance over a wide range in the infrared band, for example. Specifically, in a case where the intermediate refractive index layer 21, the high refractive index layer 22, and the low refractive index layer 23 are composed, respectively, of aluminum oxide, silicon nitride, and silicon oxide, the respective thicknesses may be $t_{21}=0.147\ \lambda_3$, $t_{22}=0.663\ \lambda_3$, and $t_{23}=0.358\ \lambda_3$, as the optical thicknesses. In such a case, with the value of transmittance of the angle of incidence from 0 degrees to 60 degrees at the wavelength of 940 nm and the wavelength of 1550 nm being 85% or more, the difference between the maximum value and the minimum value of the transmittance within these angles of incidence is 8% or less.

As another example of the optical interference film 2, an example is provided where a high refractive index layer and a low refractive index layer are stacked upon each other, one layer each for a total of two layers, in this order from the first main surface 1a side of the transparent substrate 1. In this case, it is preferable that the thicknesses of the respective layers are, where the high refractive index layer is made of copper oxide and the low refractive index layer is made of silicon oxide, 0.466 $\lambda_3$ and 0.155 $\lambda_3$ as the optical thicknesses. Also, it is preferable that the thicknesses of the respective layers, in a case where the high refractive index layer is silicon and the low refractive index layer is silicon oxide, are 0.492 $\lambda_s$ and 0.148 $\lambda_s$ as the optical thicknesses.

As yet another example of the optical interference film 2, an example is provided where high refractive index layers and low refractive index layers are alternatingly stacked upon one another, two layers each for a total of four layers, in this order from the main surface 1a side of the transparent substrate 1. In this case, it is preferable that the thicknesses of the respective layers are, where the high refractive index layers are made of copper and the low refractive index layers are made of silicon oxide, are 0.517 $\lambda_3$, 0.269 $\lambda_s$, 0.467 $\lambda_3$, and 0.142 $\lambda_s$ as the optical thicknesses in order from the first main surface 1a side of the transparent substrate 1. Also, it is preferable that the thicknesses of the respective layers, in a case where the high refractive index layers are made of silicon and the low refractive index layers are made of silicon oxide, are 1.023 $\lambda_3$, 0.296 $\lambda_3$, 0.482 $\lambda_3$, and 0.122 $\lambda_s$ as the optical thicknesses.

From the standpoint of reducing the difference between transmittance of the sensor wavelength $\lambda_3$ of 0 degrees and of 60 degrees with respect to the transmittance of the optical interference film 2, it is preferable to obtain the maximum value with the angle of incidence at 25 degrees or more, more preferable to obtain the maximum value at 30 degrees or more, and most preferable to obtain the maximum value at 35 degrees or more, after having changed the angle of incidence between light of the sensor wavelength $\lambda_3$ and an optical article from 0 degrees through to 60 degrees. Further, even in a case where the surface of the optical article is disposed to be tilted with respect to the sensor light as in the windshield of a vehicle, the range regarded as preferable above is preferable because the transmittance in the sensor wavelength $\lambda_s$ is high.

Although examples are described involving two-layer to four-layer configurations with respect to the optical interference film 2 provided on one of the main surfaces of the transparent substrate 1, the stacking structure such as the number of layers, the materials constituting the layers, the layer-stacking order, and the thickness of the layers can be appropriate changed to suit the needed optical characteristics.

As an example of a case where an optical interference film is provided on both main surfaces of the transparent substrate, the aforementioned optical interference film with one of the two-layer to four-layer configurations provided on one of the main surfaces of the transparent substrate is provided on both main surfaces. In this case, the configurations of the optical interference films provided on both main surfaces may be the same or more be different from each other.

The optical interference film 2 can be formed on the transparent substrate 1 by a publicly-known formation method. Specifically, formation is performed by using a film formation such as a thermal evaporation method, a sputtering method, an ion assisted deposition (IAD) method, and the like. In particular, in a case where a film with high scratch resistance is to be formed as the optical interference film 2, it is preferable to use a sputter method or an ion assistance deposition method so as to obtain a dense film.

In the above, the optical member 10A composed of the transparent substrate 1 and the optical interference film 2 is described with reference to FIG. 1A to FIG. 1D. In the optical member 10A, the design of the transparent substrate 1 and the optical interference film 2 can be changed to the extent that the effects of the present disclosure are not lessened. Also, components other than the transparent substrate 1 and the optical interference film 2 may be optionally included in the optical member 10A to the extent that the effects of the present disclosure are not lessened. Examples of components that may be optionally included include a coating that imparts a water repellant function, a hydrophilic function, a fogging prevention function, and the like, and a low thermal emissivity coating, an infrared light shielding coating, visible light shielding coating, a conductive coating, and the like.

The Martens hardness to be measured at the surface of the optical interference film in said optical member preferably is 4 N/mm$^2$, more preferably is 4.5 N/mm$^2$, and even more preferably is 5 N/mm$^2$ in order to satisfy the condition (4) specifying that the Martens hardness to be measured at the surface of the optical interference film is harder than the Martens hardness to be measured at the surface of the transparent substrate 1. The value of this preferred Martens hardness can be achieved by including materials, regarded as preferable in terms of hardness described above, in the high refractive index material of the optical interference film.

Furthermore, in said optical member, in a case where, for example the LiDAR sensor or the like located in the vehicle is to be made non-visible from the outside of the vehicle, the visible light transmittance in a wavelength band of 380 nm to 780 nm measured at an incidence angle of 0 degrees preferably is 30% or less, more preferably is 20% or less, and particularly preferable is 10° or less, from the standpoint of design and safety.

Furthermore, in said optical member, in a case where, for example, said optical member is to be attached to the body of a vehicle that is metallic in color, the visible light reflectance of the aforementioned wavelength band to be measured at an incidence angle of 5 degrees at the surface of the optical interference film preferably is 60% or more and more preferably is 70% or more, from the standpoint of maintaining a sense of unity in the external appearance of the vehicle. Also, the visible light reflectance in a case where, for example, said optical member is to be attached to the body of a vehicle that is a matte color type, preferably is 8% or less and more preferably is 5% or less, from the standpoint of not spoiling the external appearance of the vehicle.

Preferably, the wavefront aberration at the wavelength $\lambda_s$ is 1.0 $\lambda_{RMS}$ or less. The wavefront aberration can be calculated based on the measurement results of a surface shape by a surface shape measuring device such as a laser interferometry-type flatness measurer (for example, Verifire and Mark IV manufactured by Zygo; G310S manufactured by Fujinon, and Fiat Master manufactured by TOEI), a laser displacement meter, an ultrasonic displacement meter, a contact-type displacement meter, and the like. The remainder excluding the tilting component from the results obtained by the various types of measuring devices is the surface shape whereas the wavefront aberration is the difference between the maximum value and the minimum value of the surface shape. It is sufficient as long as the wavefront aberration satisfies the predetermined condition in a predetermined region corresponding to the location where at least the sensor on the main surface of said optical member transmits and receives infrared light. Alternatively, said optical member may satisfy the predetermined condition over the entire region of a main surface. The wavefront aberration at the wavelength $\lambda_s$ preferably is 0.9 $\lambda_{1s}$ or less, more preferably is 0.6 $\lambda_{RMS}$ or less, and even more preferably is 0.3 $\lambda_{RMS}$ or less.

As described above, in said optical member, is preferable that the transmittance and reflectance as well as the transmitted colors and reflected colors of the visible light region are adjusted such that there is harmony between the external appearance and the surroundings to suit the usage environment and the components. Therefore, a layer of, for example organic ink or inorganic ink may be used in conjunction with the optical interference film as an element other than the optical interference film to be used. In such as case, it may be necessary for the material of the ink to be transparent in the near-infrared band in order to maintain the transmittance in the near-infrared band.

In a case where said optical member is disposed on the vehicle-exterior surface of the windshield of the vehicle or on the exterior of the vehicle such as the cover member, the water contact angle to be measured in said optical member at the surface of the optical interference film preferably is 90 degrees or more and more preferably is 100 degrees or more, from the standpoint of preventing a decrease in transmittance due to infrared absorption of water. Also, in a case where said optical member is disposed on a vehicle-interior surface of the windshield of a vehicle, for example, the water contact angle to be measured at the surface of the optical interference film preferably is 20 degrees or less and more preferably is 10 degrees or less, from the standpoint of ensuring visibility.

Said optical member has a high transmittance over a wide range of incident angles with respect to infrared light. When said optical member is used as, for example, the cover member of a LiDAR sensor, infrared light used for sensing by the LiDAR sensor passes through unhampered over a wide range of incident angles. Examples of methods for attaching said optical member to a LiDAR sensor as the cover member include a method in which direct affixing is performed via an adhesive through which infrared light passes, a method involving attachment to the housing of a LiDAR sensor, and the like. In a case where said optical member has an optical interference film on only one main surface of the transparent substrate, it is preferable that the optical interference member is disposed so as to be on the LiDAR sensor-side.

The LiDAR sensor is mounted and used in, for example, a transport vehicle such as a train, an automobile, a boat, and an aerial vehicle. Said optical member is particularly suitable as a cover member of the LiDAR sensor mounted in an automobile. When the LiDAR sensor is to be mounted in an automobile, there are cases were the LiDAR sensor is attached to, for example, a bumper, a side mirror, a pillar, a rear portion of a vehicle rearview mirror, and the like. Said optical member is advantageous in that the strength and design can be adjusted in accordance with the site of application.

Furthermore, if the optical member of the present disclosure is used as window glass in a case where the LiDAR sensor is mounted on the interior of the vehicle, a decrease in sensing caused by using the window glass as an intermediary can be suppressed. In a case where the optical member of the present disclosure is used as window glass of an automobile, it is also applicable as the windshield, rear window, side glass, roof glass, and the like.

Next, the present disclosure is described in detail using embodiment examples. However, the present disclosure is not limited to the descriptions provided below. Optical members, in which the configuration of the optical interference film in the configuration illustrated in FIG. 1A is appropriately changed in each of the examples, were fabricated and evaluated. Examples 1 to 15 and 23 to 29 are embodiment examples, whereas Examples 16 to 22 are comparative examples.

Examples 1 to 22

Table 1 illustrates the composition, optical characteristics, and Martens hardness of the transparent substrates. Five types of glass substrates were used. The optical characteristics and Martens hardness of the glass substrates were measured using a method that is substantially the same as the method useable for evaluation of the optical members described further below. Glass substrates GA, GB, GC, and GE are glass substrates that satisfy the condition (A), whereas a glass substrate GD has a $T_{B700\text{-}1000}$ of less than 78%, and thus does not satisfy the condition (A). In Table 1, "Co" in the composition of the glass substrate GA indicates that the composition is cobalt (Co) oxide.

TABLE 1

| Transparent Substrate Abbreviation | | GA | GB | GC | GD | GE |
|---|---|---|---|---|---|---|
| Composition of Basic Glass [Mass %] | $SiO_2$ | 72.0 | 71.0 | 72.2 | 72.2 | 72.2 |
| | $Al_2O_3$ | 1.0 | 0.0 | 1.9 | 1.9 | 1.9 |
| | $B_2O_3$ | 0.0 | 10.0 | 0.0 | 0.0 | 0.0 |
| | MgO | 4.5 | 0.0 | 4.7 | 4.7 | 4.7 |
| | CaO | 8.3 | 0.0 | 7.9 | 7.9 | 7.9 |
| | BaO | 0.0 | 3.1 | 0.0 | 0.0 | 0.0 |
| | $Na_2O$ | 14.2 | 8.0 | 13.0 | 13.0 | 13.0 |
| | $K_2O$ | 0.0 | 7.9 | 0.3 | 0.3 | 0.3 |
| | total | 100.0 | 100.0 | 100.0 | 100.0 | 100.0 |
| | $Al_2O_3$ + MgO + CaO | 13.8 | 0.0 | 14.5 | 14.5 | 14.5 |
| External Components [Mass ppm] | Fe (In terms of $Fe_2O_3$) | 125 | 10 | 120 | 800 | 120 |
| | Oxide Amount of Cr, Co, Mn, Ce, Cu, Se | $Cr_2O_3$ 44 ppm Co 3.5 ppm | — | — | — | — |
| Sheet Thickness | | 4 mm | 4 mm | 4 mm | 4 mm | 1.4 mm |
| $T_{B700\text{-}1800}$ [%] | | 89.8 | 91 | 90.2 | 76.4 | 91.3 |
| $T_{B800\text{-}1600}$ [%] | | 91.2 | 91 | 90.2 | 76.4 | 91.3 |
| Martens Hardness [N/mm$^2$] | | 3.9 | 3.7 | 3.9 | 3.1 | 3.9 |

Table 2 illustrates configurations of eleven types of optical interference films IA to IK used in the present embodiment examples, and specifically indicates the number of layers, the stacking order the composition of materials of each layer, and the geometric thickness. The optical members according to Examples 1 to 15 and Examples 20 to 29 were fabricated by forming one optical interference film among the eleven types of optical interference films IA to IK illustrated in Table 2, using the method below, onto only the first main surface or onto both the first main surface and the second main surface of the transparent substrate in accordance with the combinations illustrated in Table 3 and Table 4. In Examples 1 and 2, Examples 5 to 8, and Example 13 of the embodiment examples, the optical interference films are designed with the wavelength $\lambda_s$ set to 940 nm. In Examples 3 and 4, Examples 9 to 12, and Example 14, the optical interference films are designed with the wavelength $\lambda_s$ set to 1550 nm. In Example 15, the optical interference film is designed with the two wavelengths $\lambda_s$ set to 940 nm and 1550 nm. In Examples 20 to 22 of the comparative examples, the optical interference film is designed with the wavelength $\lambda_s$ set to 940 nm. The optical members according to Examples 16 to 19 among the comparative examples are not provided with an optical interference film.

Table 2 illustrates a layer configuration of the optical interference film as the first layer, the second layer, the third layer, and the fourth layer in this order on the side of the transparent substrate. In Table 2, a cell with a diagonal line indicates that there is no layer.

interference films II and IK were adjusted such that the respective thicknesses are illustrated in Table 2 as "nm".

For forming the silicon nitride layer that is the high refractive index layer, an Si target was used, argon was used as the discharge gas of the reaction chamber, and nitride was used as the discharge gas of the reaction chamber. The pressure during film formation was 0.15 Pa. The geometric thicknesses of the silicon nitride layer in the optical interference films 1A to ID and the optical interference films II and IK were adjusted such that the respective thicknesses are illustrated in Table 2 as "nm".

For forming the silicon oxide layer that is the low refractive index layer, an Si target was used, argon was used as the

TABLE 2

| Optical Interference Film Abbreviation | Bottom Layer | First Layer | Second Layer | Third Layer | Fourth Layer | Number of Layers | Film Thickness [nm] |
|---|---|---|---|---|---|---|---|
| IA | Transparent Substrate | Al$_2$O$_3$ 199 nm | SiN$_x$ 76 nm | SiO$_2$ 220 nm | | 3 | 495 |
| IB | | Al$_2$O$_3$ 330 nm | SiN$_x$ 130 nm | SiO$_2$ 363 nm | | 3 | 823 |
| IC | | Al$_2$O$_3$ 147 nm | SiN$_x$ 65 nm | SiO$_2$ 200 nm | | 3 | 412 |
| ID | | Al$_2$O$_3$ 213 nm | SiN$_x$ 81 nm | SiO$_2$ 234 nm | | 3 | 528 |
| IE | | CuO 282 nm | SiO$_2$ 165 nm | | | 2 | 447 |
| IF | | Si 199 nm | SiO$_2$ 157 nm | | | 2 | 356 |
| IG | | CuO 313 nm | SiO$_2$ 285 nm | CuO 283 nm | SiO$_2$ 151 nm | 4 | 1032 |
| IH | | Si 414 nm | SiO$_2$ 314 nm | Si 195 nm | SiO$_2$ 129 nm | 4 | 1052 |
| II | | Al$_2$O$_3$ 141 nm | SiN$_x$ 234 nm | SiO$_2$ 161 nm | | 3 | 536 |
| IJ | | SiO$_x$N$_y$ 131 nm | SiO$_2$ 161 nm | | | 2 | 292 |
| IK | | Al$_2$O$_3$ 83 nm | SiN$_x$ 310 nm | SiO$_2$ 231 nm | | 3 | 624 |
| IL | | TiZrO$_2$ 19 nm | SiO$_2$ 22 nm | TiZrO$_2$ 152 nm | SiO$_2$ 150 nm | 4 | 344 |
| IM | | SiNx 31 nm | SiO$_2$ 49 nm | SiNx 130 nm | SiO$_2$ 169 nm | 4 | 379 |
| IN | | TiO$_2$ 30 nm | SiO$_2$ 51 nm | TiO$_2$ 185 nm | SiO$_2$ 185 nm | 4 | 451 |
| IO | | Nb$_2$O$_5$ 28 nm | SiO$_2$ 52 nm | Nb$_2$O$_5$ 174 nm | SiO$_2$ 174 nm | 4 | 428 |
| IP | | Ta$_2$O$_5$ 28 nm | SiO$_2$ 54 nm | Ta$_2$O$_5$ 180 nm | SiO$_2$ 181 nm | 5 | 443 |

The formation of the optical interference film was performed by using a sputtering device (RAS1100BII manufactured by Shincron). The optical interference films IA to ID and the optical interference films II and IK were configured with an aluminum oxide layer that is the intermediate refractive index layer as the first layer, a silicon nitride layer that is the high refractive index layer as the second layer, and a silicon oxide layer that is the low refractive index layer as the third layer. With exception to the difference in geometric thicknesses between layers, the optical interference films IA to ID and optical interference films II and IK are formed using substantially the same method.

For forming the aluminum oxide layer that is the intermediate refractive index layer, an Al target was used, argon was used as the discharge gas in the film formation chamber, and oxygen was used as the discharge gas of the reaction chamber. The pressure during film formation was 0.15 Pa. The geometric thicknesses of the aluminum oxide layer in the optical interference films IA to ID and the optical discharge gas in the film formation chamber, and oxygen was used as the gas of the reaction chamber. The pressure during film formation was 0.15 Pa. The geometric thicknesses of the silicon oxide layer in the optical interference films IA to ID and the optical interference films II and IK were adjusted such that the respective thicknesses are illustrated in Table 2 as "nm".

For forming the high refractive index materials, namely, a titanium oxide layer containing zirconium oxide, a titanium oxide layer, a niobium oxide layer, and a tantalum oxide layer, a titanium target containing 50 mol % of zirconium, a titanium target, a niobium target, and a tantalum target oxide layer, were used respectively, whereas argon was used as the discharge gas of the film formation chamber, and oxygen was used as the discharge gas of the reaction chamber. The pressure during film formation was 0.15 Pa. The geometric thicknesses of the respective high refractive index layers in the optical interference films IL to IP were adjusted such that the respective thicknesses are illustrated in Table 2 as "nm".

Regarding the optical interference film IE and the optical interference film IG, the copper oxide layer that is the high refractive index layer and the silicon oxide layer that is the low refractive index layer were, in this order on the side of the glass substrate, respectively formed once for each layer and twice for each layer alternatingly, such that the geometric thicknesses of the respective layers are the values illustrated in Table 2.

For forming the copper oxide layer that is the high refractive index layer, a Cu target was used, argon was used as the discharge gas of the film formation chamber, and oxygen was used as the discharge gas of the reaction chamber. The pressure during film formation was 0.15 Pa. The geometric thicknesses of the copper oxide layer in the optical interference films IE and IG were adjusted such that the respective thicknesses are illustrated in Table 2 as "nm". The formation of the silicon oxide layer that is the low refractive index layer was performed in substantially the same manner as described above. In the optical interference film IG, the formation of the copper oxide layer and the formation of the silicon oxide layer were performed repeatedly to form the optical interference film of the configuration illustrated in Table 2.

Regarding optical interference film IF and optical interference film IH, the silicon layer that is the high refractive index layer and the silicon oxide layer that is the low refractive index layer were, in this order on the side of the glass substrate, respectively formed once for each layer and twice for each layer alternatingly, such that the geometric thicknesses of the respective layers are the values as illustrated in Table 2.

For forming the silicon layer that is the high refractive index layer, a Si target was used, whereas argon was used as the discharge gas in the film formation chamber and the reaction chamber. The pressure during film formation was 0.15 Pa. The geometric thicknesses of the silicon layer in the optical interference film IF and the optical interference film IH were adjusted such that the respective thicknesses are illustrated in Table 2 as "nm". The formation of the silicon oxide layer that is the low refractive index layer was performed in substantially the same manner as described above. In the optical interference film IH, the formation of the silicon oxide layer and the formation of the silicon layer were performed repeatedly to form the optical interference film of the configuration illustrated in Table 2.

Regarding the optical interference film IJ, the silicon oxynitride layer that is the high refractive index layer and the silicon oxide layer that is the low refractive index layer were formed in this order onto the side of the glass substrate such that the geometric thicknesses of the respective layers are values as illustrated in Table 2.

For forming the silicon oxynitride that is the high refractive index layer, an Si target was used, whereas argon was used as the discharge gas of the film formation chamber and a mixture of gas with a volume ratio of oxygen to nitrogen of 1:10 was used. The pressure during film formation was 0.15 Pa. The geometric thicknesses of the silicon layers in the optical interference film IJ were adjusted such that the respective geometrical thicknesses are in [nm] as illustrated in Table 2. The silicon oxide layer that is the low refractive index layer is formed in substantially the same manner as described above.

Table 3 and Table 4 for each embodiment example illustrate the abbreviations of glass substrates used and abbreviations of the optical interference film(s) formed on one or both main surfaces of the glass substrate along with the evaluation results described below. In Table 3 and Table 4, the first main surface 1a of the transparent substrate (glass substrate) is illustrated as the first optical interference film and the optical interference film formed on the second main surface 1b is illustrated as the second optical interference film. The symbol "–" indicates that no optical interference film was formed.

(Evaluation)
(1) Optical performance

Figure 2A:
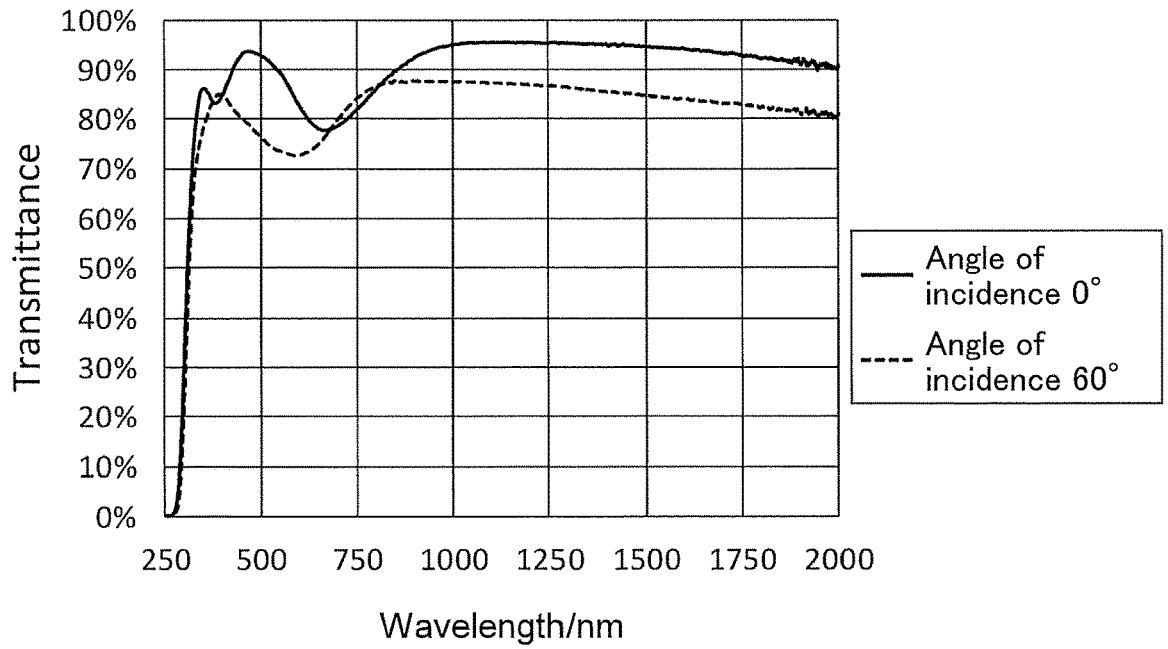
FIG. 2A is a spectral transmittance curves with respect to incident light with an incidence angle of 0 degrees and an incidence angle of 60 degrees of an optical member according to Example 1 of embodiment examples.
Figure 3A:
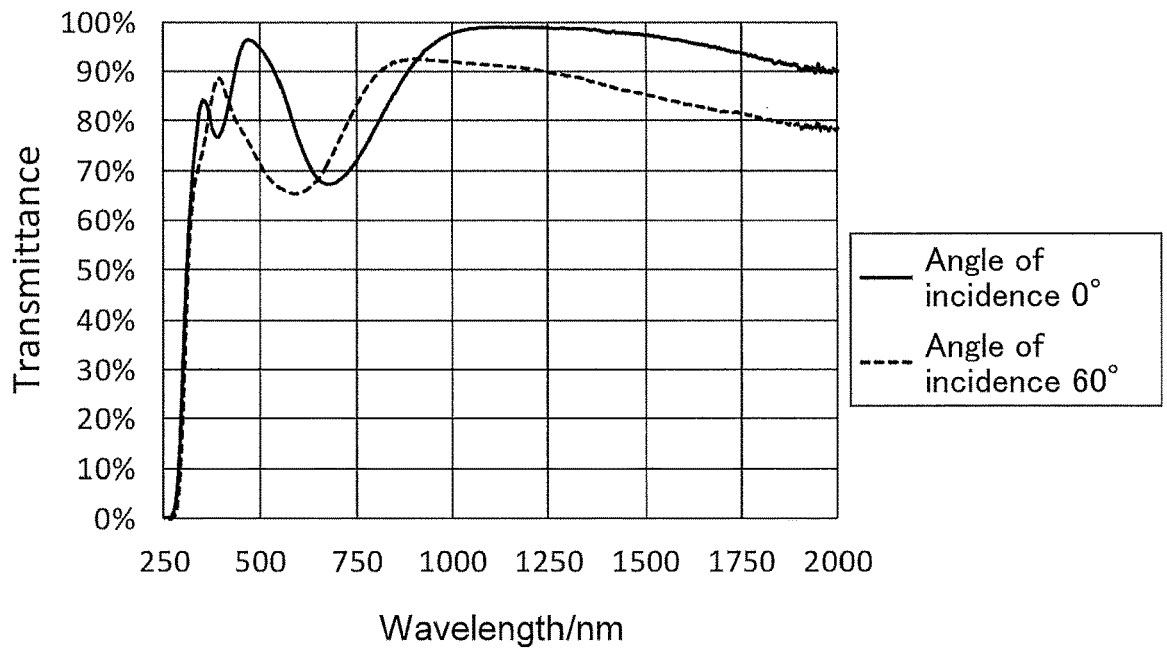
FIG. 3A is a spectral transmittance curves with respect to incident light with an incidence angle of 0 degrees and an incidence angle of 60 degrees of an optical member according to Example 2 of the embodiment examples.

The optical characteristics below were measured using the spectrophotometer (V-570 manufactured by Hitachi High-Tech). The first optical interference film of the optical member was irradiated with measurement light. FIG. 2A and FIG. 3A illustrate spectral transmittance curves in the incidence angle of 0 degrees and in the incidence angle of 60 degrees of the optical member of Example 1 and the optical member of Example 2, respectively.

$$T_{(1)min} \text{ and } \Delta T_{(1)} \qquad (1)$$

Transmittance was measured in 5 degree increments from an incidence angle of 0 degrees through to 60 degrees for a total of 13 times in the wavelength band of 200 nm to 1800 nm. Based on this 13-point transmittance curve, a minimum value and a maximum value of transmittance at the wavelength $\lambda_s$ were obtained. Table 3 and Table 4 illustrate the minimum value and the maximum value of the transmittance as the incidence angles ($\theta_2$, $\theta_1$) at that time and $T_{(1)min}$ ($\theta_2$), $T_{(1)max}$ ($\theta_1$) and the difference between these as $\Delta T_{(1)}$. In a case where the $T_{(1)min}$ is the transmittance at the incidence angle of 60 degrees, that is, in a case where the minimum value is obtained when $\theta_2$ is 60 degrees, the notation of the angle with the brackets is omitted. Likewise, in a case where the $T_{(1)max}$ is the transmittance at the incidence angle of 0 degrees, that is, in a case where the maximum value is obtained when $\theta_1$ is 0 degrees, the notation of the angle with the brackets is omitted.

Figure 2B:
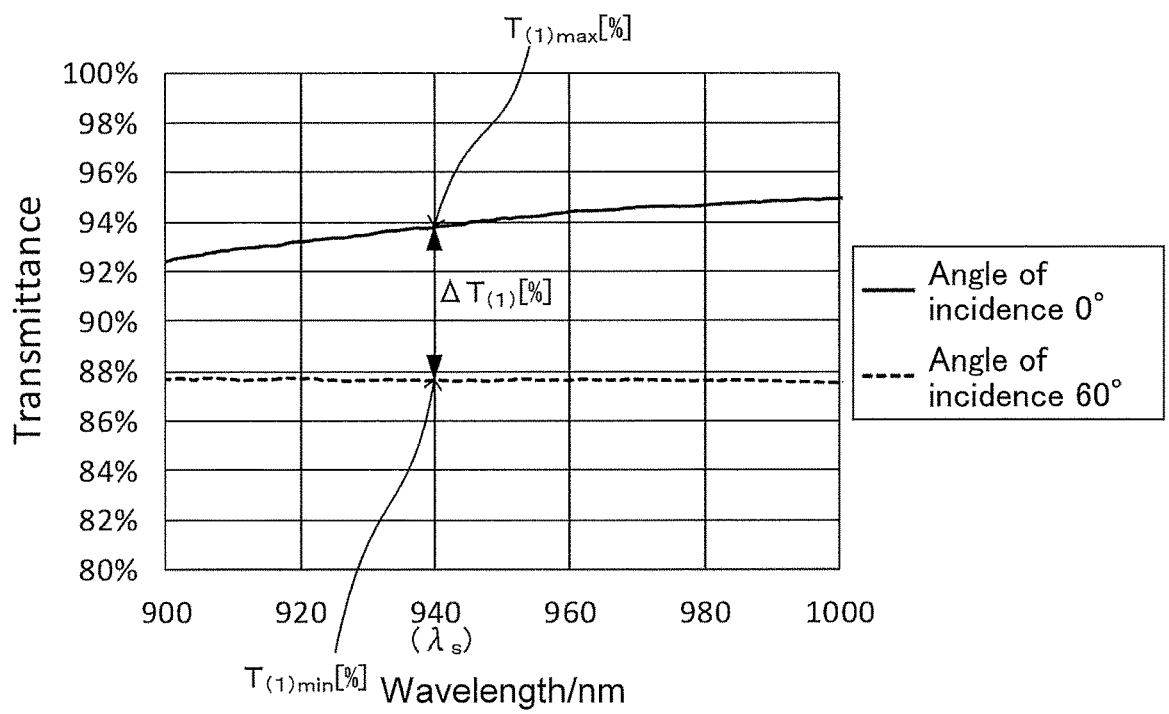
FIG. 2B is a spectral transmittance curves, in vicinity of a predetermined wavelength A (940 nm), with respect to incident light with an incidence angle of 0 degrees and an incidence angle of 60 degrees of the optical member according to Example 1 of the embodiment examples.
Figure 3B:
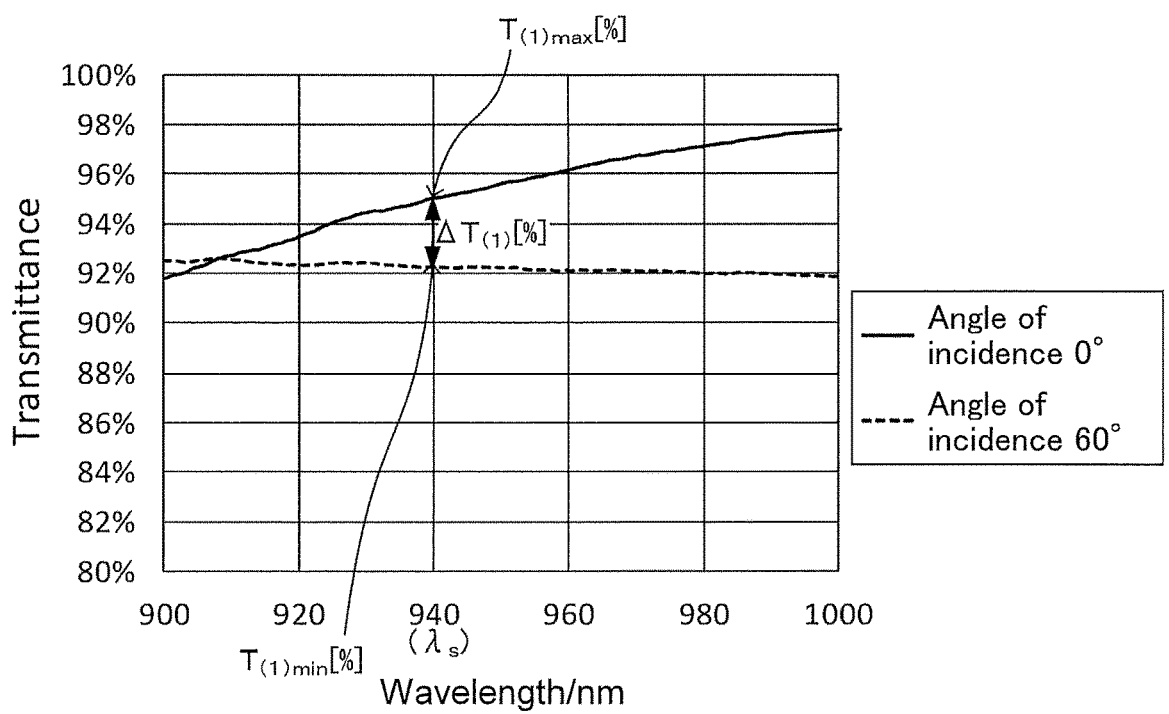
FIG. 3B is a spectral transmittance curves, in the vicinity of the predetermined wavelength A (940 nm), with respect to an incident light with an incidence angle of 0 degrees and an incidence angle of 60 degrees of the optical member according to Example 2 of the embodiment examples.

FIG. 2B and FIG. 3B illustrate the spectral transmittance curves, in vicinity of a set wavelength $\lambda_3$ (940 nm) at an incidence angle of 0 degrees and an incidence angle of 60 degrees of the optical member according to Example 1 and the optical member according to Example 2, respectively. Also, the $T_{(1)min}$ and the $T_{(1)max}$ positions and $\Delta T_{(1)}$ are illustrated in the spectral transmittance curves. In Example 1 and in Example 2, since the is the transmittance at the incidence angle of 60 degrees and $T_{(1)max}$ is the transmittance at the incidence angle of 0 degrees, the notations in the spectral transmittance curves for the incidence angles of 5 degrees to 55 degrees are omitted.

(2) Light loss of wavelength $\lambda_s$

The transmittance and reflectance at an incidence angle of 5 degrees were measured using a spectrophotometer and an absolute reflectance device. At wavelength $\lambda_s$, the value obtained by subtracting the reflectance and the transmittance from 100% is regarded as the light loss.

Regarding Example 1 to Example 15 and Example 20 to Example 22, the optical characteristics corresponding to the wavelength $\lambda_3$ set for design of the optical interference film are illustrated in Table 3 and Table 4. In Example 16 to Example 19, the optical characteristics likewise are evaluated assuming a case in which a predetermined wavelength $\lambda_s$ is 940 nm and a case in which a predetermined wavelength $\lambda_3$ is 1550 nm.

(3) Evaluation by high temperature and high humidity test

The change (difference between the transmittance before the test and the transmittance after the test) in transmittance at an incidence angle of 0 degrees at the wavelength $\lambda_3$ upon exposing the optical member to an environment with a temperature of 60° C. and a relative humidity of 80% for 48 hours is evaluated. A change in transmittance that is 1% or less is needed.

(4) Martens hardness

The Martens hardness at a surface of the first optical interference film of the optical member was measured using PICODENTOR (HM500 manufactured by Helmut Fischer). The measurement was performed 15 times with the indentation depth as 50±10 nm. The average value of the measurements taken 15 times is regarded as the Martens hardness. In Examples 16 to 19 that are without an optical interference film, no measurement was performed.

(5) Heating test

An optical member was inserted in a batch furnace heated to 600 degrees and an optical member was inserted into a batch furnace heated to 660 degrees, kept in for 10 minutes, and then removed. The change (difference between the transmittance before the test and the transmittance after the test) in the transmittance at incidence angle of 0 degrees at the wavelength $\lambda_3$ was evaluated. A change in transmittance that is 1% or less is needed.

(Wavefront aberration)

The surface shape is obtained based on the remainder after having removed the tilt components from the results of the measurement performed using a laser interferometry-type flatness measurer (Verifire or Mark IV manufactured by Zygo). The difference between the maximum value and the minimum value of the surface shape is regarded as the wavefront aberration. The measurement is performed in a range with a diameter of 00 mm. The wavefront aberration regarding the optical members of Examples 23 to 29 was measured before and after the aforementioned 660-degree heating test.

TABLE 3

| | Configuration | | | Optical Characteristics | | | |
|---|---|---|---|---|---|---|---|
| | First Optical Interference Film | Transparent Substrate | Second Optical Interference Film | Wavelength $\lambda_s$ [nm] | $T_{(1)max}(\theta_1)$ [%] | $T_{(1)min}(\theta_2)$ [%] | $\Delta T_{(1)}$ [%] |
| Example 1 | IA | GA | — | 940 | 93.8 | 87.7 | 6.1 |
| Example 2 | IA | GA | IA | 940 | 95.0 | 92.3 | 2.7 |
| Example 3 | IB | GA | — | 1550 | 95.0 | 88.2 | 6.8 |
| Example 4 | IB | GA | IB | 1550 | 97.8 | 92.5 | 5.3 |
| Example 5 | IC | GA | — | 940 | 95.2 | 88.5 | 6.7 |
| Example 6 | IC | GA | IC | 940 | 98.3 | 93.9 | 4.4 |
| Example 7 | ID | GA | — | 940 | 93.3 | 88.3 | 5.0 |
| Example 8 | IA | GA | IC | 940 | 95.9 | 93.2 | 2.7 |
| Example 9 | IE | GA | — | 1550 | 95.7 | 87.2 | 8.5 |
| Example 10 | IF | GA | — | 1550 | 94.5 | 87.5 | 7.0 |
| Example 11 | IG | GA | — | 1550 | 96.0 | 88.0 | 8.0 |
| Example 12 | IH | GA | — | 1550 | 95.3 | 87.1 | 8.2 |
| Example 13 | IA | GB | — | 940 | 94.7 | 88.2 | 6.5 |
| Example 14 | IA | GE | — | 1550 | 94.0 | 86.7 | 7.0 |
| Example 15 | IK | GA | — | 940 | 93.8 (40°) | 88.8 | 5.0 |
| | | | | 1550 | 95.5 (30°) | 88.4 | 7.1 |

| | Evaluation | | | | | |
|---|---|---|---|---|---|---|
| | Optical Characteristics Light Loss [%] | Martens Hardness [N/mm²] | High Temperature High Humidity Test Evaluation [%] | 600 Degree Heating [%] | 660 Degree Heating [%] | Maximum Transmittance Incidence Angle $\theta_1$ [DEG] |
| Example 1 | 0.15 | 5.3 | 0.18 | 0.31 | 0.32 | 35 |
| Example 2 | 0.37 | 5.3 | 0.21 | 0.32 | 0.21 | |
| Example 3 | 0.21 | 5.5 | 0.31 | 0.31 | 0.31 | 35 |
| Example 4 | 0.42 | 5.5 | 0.45 | 0.45 | 0.45 | |
| Example 5 | 0.16 | 5.1 | 0.32 | 0.32 | 0.32 | 35 |
| Example 6 | 0.36 | 5.1 | 0.31 | 0.31 | 0.31 | |
| Example 7 | 0.19 | 5.3 | 0.21 | 0.21 | 0.21 | 40 |
| Example 8 | 0.38 | 5.3 | 0.21 | 0.21 | 0.21 | 40 |
| Example 9 | 0.21 | 4.0 | 0.81 | 0.89 | 1.20 | 35 |
| Example 10 | 0.38 | 4.6 | 1.21 | 1.80 | 2.50 | 35 |
| Example 11 | 0.88 | 4.1 | 0.83 | 0.91 | 1.25 | 35 |
| Example 12 | 0.48 | 4.8 | 1.32 | 1.52 | 0.51 | 35 |
| Example 13 | 0.16 | 5.3 | 0.23 | 0.32 | 0.71 | 35 |
| Example 14 | 0.97 | 5.5 | 0.24 | 0.31 | 0.41 | 35 |
| Example 15 | 0.18 | 5.2 | 0.32 | 0.32 | 0.48 | 40 |
| | | | | 0.34 | 0.51 | 30 |

TABLE 4

| | Configuration | | | Optical Characteristics | | | | |
|---|---|---|---|---|---|---|---|---|
| | First Optical Interference Film | Transparent Substrate | Second Optical Inteference Film | Wavelength λs [nm] | $T_{(1)max}$ ($\theta_1$) [%] | $T_{(1)min}$ ($\theta_2$) [%] | $\Delta T_{(1)}$ [%] | Light Loss [%] |
| Example 16 | — | GA | — | 940 | 92.3 | 84.8 | 7.5 | — |
| | | | | 1550 | 92.4 | 84.9 | 7.5 | — |
| Example 17 | — | GB | — | 940 | 92.1 | 84.6 | 7.5 | — |
| | | | | 1550 | 92.3 | 84.8 | 7.5 | — |
| Example 18 | — | GC | — | 940 | 89.5 | 81.6 | 7.9 | — |
| | | | | 1550 | 90.5 | 82.8 | 7.7 | — |
| Example 19 | — | GD | — | 940 | 78.1 | 68.9 | 9.2 | — |
| | | | | 1550 | 84.0 | 75.4 | 8.6 | — |
| Example 20 | IA | GD | — | 940 | 80.3 | 72.1 | 8.2 | 17 |
| Example 21 | II | GA | — | 940 | 80.9 | 71.2 | 9.7 | 0.18 |
| Example 22 | IJ | GA | — | 940 | 96.0 | 86.6 | 9.4 | 0.11 |
| Example 23 | IM | GA | — | 940 | 95.3 | 88.2 | 7.1 | 0.21 |
| Example 24 | IM | GA | IM | 940 | 98.5 | 93.4 | 5.1 | 0.87 |
| Example 25 | IN | GA | — | 940 | 94.7 | 88.4 | 6.3 | 0.21 |
| Example 26 | IL | GA | — | 940 | 94.7 | 88.5 | 6.2 | 0.22 |
| Example 27 | IL | GA | IL | 940 | 98.4 | 93.5 | 4.9 | 0.22 |
| Example 28 | IO | GA | — | 940 | 94.6 | 88.4 | 6.2 | 0.12 |
| Example 29 | IP | GA | — | 940 | 94.5 | 88.4 | 6.1 | 0.05 |

| | Evaluation | | | | | | |
|---|---|---|---|---|---|---|---|
| | Martens Hardness [N/mm$^2$] | High Temperature High Humidity [%] | 600 Degree Heating [%] | 660 Degree Heating [%] | Maximum Transmittance Incidence Angle θ1 [DEG] | Wavefront Aberration After 660 Degree Heating [nm] | Wavefront Aberration Before Heating [nm] |
| Example 16 | 3.9 | 0.21 | 0.20 | 0.20 | 0 | | |
| Example 17 | 3.3 | 0.21 | 0.21 | 0.21 | 0 | | |
| Example 18 | 3.9 | 0.24 | 0.23 | 0.24 | 0 | | |
| Example 19 | 3.1 | 0.25 | 0.21 | 0.24 | 0 | | |
| Example 20 | 3.1 | 0.12 | 0.32 | 0.39 | 30 | | |
| Example 21 | 5.2 | 0.14 | 0.35 | 0.38 | 15 | | |
| Example 22 | 3.5 | 0.11 | 0.35 | 0.39 | 15 | | |
| Example 23 | 4.9 | 0.14 | 0.31 | 0.51 | 35 | 0.007 λ | 0.005 λ |
| Example 24 | 5.2 | 0.08 | 0.38 | 0.71 | 35 | | |
| Example 25 | 3.7 | 0.15 | 0.81 | 9.20 | 35 | 0.091 λ | 0.005 λ |
| Example 26 | 4.1 | 0.15 | 0.32 | 0.48 | 35 | 0.005 λ | 0.008 λ |
| Example 27 | 4.1 | 0.18 | 0.34 | 0.51 | 35 | | |
| Example 28 | 3.7 | 0.21 | 1.70 | 11.30 | 35 | 0.129 λ | 0.005 λ |
| Example 29 | 3.8 | 0.08 | 0.10 | 0.13 | 35 | 0.004 λ | 0.004 λ |

As illustrated in Table 3, the optical members of the embodiment examples satisfy the conditions (1), (2), and (4). Furthermore, the optical members of the embodiment examples satisfy the condition (3) with exception to Example 10. However, regarding the optical members of the comparative examples illustrated in Table 4, the optical members of Example 20 to Example 22 do not satisfy the condition (1) at the set wavelength $\lambda_3$ of 940 nm and in the case where the optical members of Example 16 to Example 19 are set to predetermined wavelengths $\lambda_3$ of, for example, 940 nm and 1550 nm, the condition (1) is not satisfied. Furthermore, confirmation, based on the spectral transmittance curves measured at incidence angles of 0 degrees to 60 degrees, was made that the optical members of the comparative examples do not satisfy the condition (1) even in a case where a wavelength in a range from 700 nm to 1800 nm is set as $\lambda_3$.

This international patent application claims the priority based on the Japanese patent application No. 2018-134363 filed on Jul. 17, 2018, which is incorporated herein by reference in its entirety.

REFERENCE SIGNS LIST

10A Optical member
1 Transparent substrate
2 Optical interference film
10B Optical member (windshield)
3 Opening
4 Blocking layer
20 Windshield
5 Optical adhesive layer
40 LiDAR sensor main unit

What is claimed is:

1. An optical member comprising:
a transparent substrate
containing at least one substance selected from glass, a glass ceramic, silicon, and sapphire, and
having an infrared high-transmittance region in which the optical transmittance is 78% or more throughout the wavelength band of 700 nm to 1800 nm; and an optical interference film
   disposed on a main surface of the transparent substrate corresponding to the infrared high-transmittance region,
wherein the transmittance of light, of the optical member, of at least one wavelength $\lambda_s$ in the wavelength band of 700 nm to 1800 nm in a region of the optical member corresponding to the infrared high-transmittance region of the transparent substrate
has a minimum value of 86.5% or more and
has a difference between the minimum value and a maximum value of 9% or less where the incidence angle ranges from 0 degrees to 60 degrees.

2. The optical member according to claim 1, wherein light loss in light of the wavelength $\lambda_s$ incident at an incidence angle of 5 degrees is 3% or less in the region of the optical member corresponding to the infrared high-transmittance region of the transparent substrate.

3. The optical member according to claim 1, wherein a change in the transmittance at the wavelength $\lambda_s$ at the incidence angle of 0 degrees in the region of the optical element corresponding to the infrared high-transmittance region of the transparent substrate, upon exposing the optical member to an environment with a temperature of 60° C. and a relative humidity of 80% for 48 hours, is 1% or less.

4. The optical member according to claim 1, wherein a Martens hardness at an indentation depth of 50 nm to be measured at a surface of the optical interference film of the optical member is greater than the Martens hardness at an indentation depth of 50 nm to be measured at a surface of the transparent substrate.

5. The optical member according to claim 1, wherein the optical interference film has two or more layers including a low refractive index layer and a high refractive index layer.

6. The optical member according to claim 5, wherein the low refractive index layer and the high refractive index layer are arranged adjacent to each other, and a difference in a refractive index of the low refractive index layer and a refractive index of the high refractive index layer adjacent to each other is 0.1 or more.

7. The optical member according to claim 5, wherein the high refractive index layer is mainly composed of at least one substance selected from silicon nitride, silicon oxynitride, aluminum nitride, aluminum oxynitride, zirconium oxide, tin oxide, cerium oxide, silicon, and copper oxide.

8. The optical member according to claim 5, wherein the optical interference film has the low refractive index layer and the high refractive index layer adjacent to each other, and further has an intermediate refractive index layer, and the intermediate refractive index layer is mainly composed of at least one substance selected from aluminum oxide, silicon oxynitride, aluminum oxynitride, a mixture of silicon oxide and zirconium oxide, and a mixture of silicon oxide and aluminum nitride.

9. The optical member according to claim 5, wherein at least one of the layers of the optical interference film has a geometric thickness of 50 nm or more.

10. The optical member according to claim 1, wherein the optical interference film has a total geometric film thickness of 300 nm or more.

11. The optical member according to claim 1, wherein the transparent substrate is iron- containing glass containing 1 to 500 mass ppm of iron (Fe) in terms of ferric trioxide ($Fe_2O_3$) with respect to basic glass contains a total of aluminum oxide ($Al_2O_3$), magnesium oxide (MgO), and calcium oxide (CaO) at a 0.1 to 30 mass %.

12. The optical member according to claim 11, wherein the iron-containing glass further contains at least one substance of 0.0001 to 2.5 mass %, selected from the group consisting of chromium (Cr) oxide, cobalt (Co) oxide, manganese (Mn) oxide, cerium (Ce) oxide, copper (Cu) oxide, and selenium (Se) oxide.

13. The optical member according to claim 1, wherein the transparent substrate is toughened glass.

14. The optical member according to claim 13, wherein, upon crushing of the transparent substrate by using a method according to Japanese Industrial Standard JIS R 3211, a square region of 50 mm×50 mm is crushed into 40 fragments to 400 fragments.

15. The optical member according to claim 1, wherein the transparent substrate is laminated glass.

16. The optical member according to claim 15, wherein there is a total weight of 20 g or less of fragment debris coming from a side opposite to where the transparent substrate is impacted upon crushing of the transparent substrate by using a method according to Japanese Industrial Standard JIS R 3211.

17. The optical member according to claim 1, wherein the transparent substrate has a thickness of 1.5 mm to 4.5 mm.

18. The optical member according to claim 1, wherein one or more of said wavelength $\lambda_s$ exist in a range of 840 nm to 1000 nm.

19. The optical member according to claim 1, wherein one or more said wavelength $\lambda_s$ exist in a range of 1400 nm to 1600 nm.

20. The optical member according to claim 1, wherein one or more of said wavelength $\lambda_s$ exist in each of a range of 840 nm to 1000 nm and a range of 1400 nm to 1600 nm.

* * * * *